United States Patent
Georgakopoulos et al.

(10) Patent No.: US 9,985,460 B2
(45) Date of Patent: May 29, 2018

(54) MINIATURIZED HIGHLY EFFICIENT WIRELESS POWER TRANSFER ELEMENTS USING MULTIPLE LAYERS OF RESONATORS AND/OR TUNABLE CAPACITORS

(71) Applicants: Stavros Georgakopoulos, Boca Raton, FL (US); Kun Bao, Miami, FL (US)

(72) Inventors: Stavros Georgakopoulos, Boca Raton, FL (US); Kun Bao, Miami, FL (US)

(73) Assignee: The Florida International University Board of Trustees, Miami, FL (US)

( * ) Notice: Subject to any disclaimer, the term of this patent is extended or adjusted under 35 U.S.C. 154(b) by 386 days.

(21) Appl. No.: 14/802,794

(22) Filed: Jul. 17, 2015

(65) Prior Publication Data
US 2017/0018935 A1    Jan. 19, 2017

(51) Int. Cl.
*H02J 5/00* (2016.01)
*H02J 7/02* (2016.01)
*H02J 50/12* (2016.01)

(52) U.S. Cl.
CPC ............. *H02J 7/025* (2013.01); *H02J 50/12* (2016.02)

(58) Field of Classification Search
None
See application file for complete search history.

(56) References Cited

U.S. PATENT DOCUMENTS

| 1,119,732 | A | 12/1914 | Tesla | |
|---|---|---|---|---|
| 8,258,909 | B2* | 9/2012 | Li | B29C 66/82661 336/200 |
| 2011/0198940 | A1* | 8/2011 | Urano | H01F 38/14 307/104 |
| 2012/0032632 | A1* | 2/2012 | Soar | H01F 38/14 320/108 |
| 2013/0300207 | A1* | 11/2013 | Wang | H04B 5/0037 307/104 |
| 2013/0308256 | A1* | 11/2013 | Lehr | G06F 1/266 361/679.01 |
| 2015/0097521 | A1* | 4/2015 | Endou | H01F 27/2804 320/108 |

OTHER PUBLICATIONS

Bao, Kun "Conformal SCMR System with Multiple Resonators," IEEE 2015 International Symposium on Antennas and Propagation and North American Radio Science Meeting, Vancouver, BC, Canada, Jul. 19-24, 2015.

(Continued)

*Primary Examiner* — Jared Fureman
*Assistant Examiner* — Joel Barnett
(74) *Attorney, Agent, or Firm* — Saliwanchik, Lloyd & Eisenschenk

(57) ABSTRACT

Novel and advantageous systems and methods for wireless power transfer (WPT) via multiple-resonator conformal strongly coupledmagnetic resonance (CSCMR) are provided. Instead of using a single loop as a resonator, multiple resonators can be used. This leads to lower operating frequency (e.g., 30% decrease), extended WPT range (e.g., 20% increase), and higher WPT efficiency compared to single-resonator systems of the same size.

20 Claims, 25 Drawing Sheets

(56) References Cited

OTHER PUBLICATIONS

Donaldson, N. de N. "Analysis of resonant coupled coils in the design of radio frequency transcutaneous links," Medical & Biomedical Engineering and Computing, 1983, 21(5): 612-627.
Hu, Hao. et al., "Printable and Conformal Strongly Coupled Magnetic Resonant Systems for Wireless Powering," IEEE $15^{th}$ Annual IEEE Wireless and Microwave Technology Conference (WAMICON), Tampa Bay, FL, Jun. 6, 2014.
Georgakopoulos, Stavros, "Miniaturized Highly Efficient Wireless Power Transfer Elements Using Multiple Layers of Resonators and/or Tunable Capacitors," PowerPoint Presentation.
Kurs, André et al. "Wireless power transfer via strongly coupled magnetic resonances," Science, 2007, 317(5834):83-86.

* cited by examiner

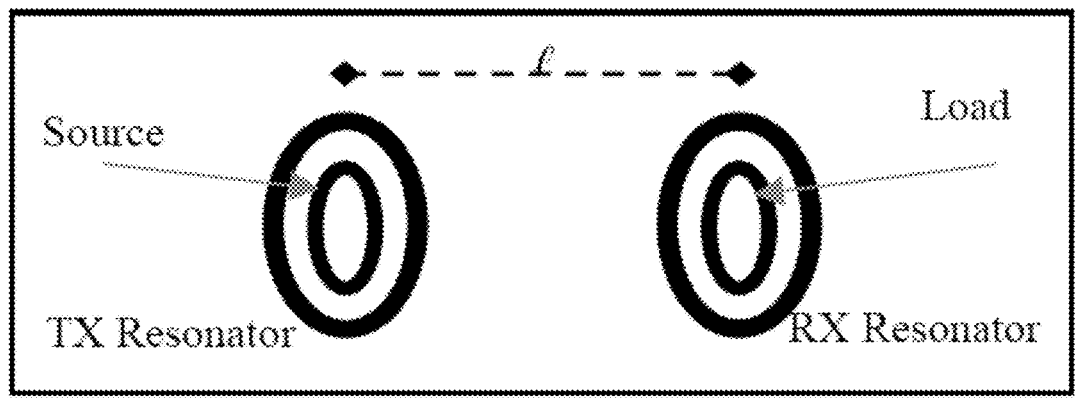
FIG. 1
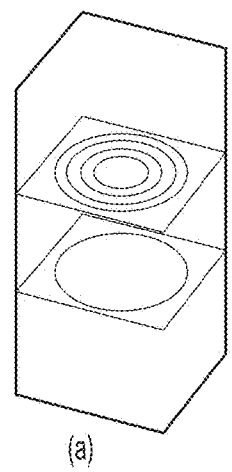 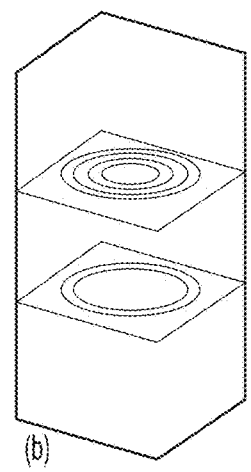
FIG. 2A  FIG. 2B (a)

(b)

Simulation:
Freq=85.8MHz
E=80.1%

Measurement:
Freq=84.1MHz
E=74.5%

MINIATURIZED HIGHLY EFFICIENT WIRELESS POWER TRANSFER ELEMENTS USING MULTIPLE LAYERS OF RESONATORS AND/OR TUNABLE CAPACITORS

GOVERNMENT SUPPORT

The subject invention was made with government support under a research project supported by the National Science Foundation under grant number ECCS 1307984, and by the Army Research Office under grant number W911NF-13-1-0149. The government has certain rights in the invention.

BACKGROUND

Wireless power transmission (WPT) often uses inductive power delivery, which is the use of non-radiating magnetic fields generated by a transmitter coil to induce a current in a receiver coil. Generally, for strong inductive coupling, the coils should be very close to each other. WPT is used in a variety of applications, and medical implants have used inductive power delivery for over 30 years.

The strongly coupled magnetic resonator (SCMR) has been used since 2007 (Kurs et al., *Science* 317(5834):83-86, 2007). SCMR systems show good efficiency and range, but they require a certain distance between the source and the resonators. Therefore, the traditional SCMR structures occupy a significant volume, making it difficult to use them for consumer electronic devices or medical devices.

BRIEF SUMMARY

The subject invention provides novel and advantageous systems and methods for wireless power transfer (WPT) via multiple-resonator conformal strongly coupled magnetic resonance (CSCMR). Instead of using a single loop as a resonator, as with related art systems, multiple resonators (e.g., using multiple loops) are used. This leads to lower operating frequency (e.g., 30% or more decrease from the operating frequency of the same size single-resonator system), extended WPT range (e.g., 20% or more increased range compared to the same size single-resonator system), and higher WPT efficiency.

In an embodiment, a WPT system can include comprising a transmitter (TX) element and a receiver (RX) element. The TX can include: a TX lumped capacitor; a first TX resonator disposed on a first surface of a TX substrate; and a second TX resonator, wherein the second TX resonator is disposed either on a second surface of the TX substrate opposite to the first surface of the TX substrate or within the TX substrate as a layer between the first and second surfaces of the TX substrate. The RX element can include: a RX lumped capacitor; a first RX resonator disposed on a first surface of a RX substrate; and a second RX resonator, wherein the second RX resonator is disposed either on a second surface of the RX substrate opposite to the first surface of the RX substrate or within the RX substrate as a layer between the first and second surfaces of the RX substrate.

BRIEF DESCRIPTION OF THE DRAWINGS

FIG. 1 shows a schematic view of a conformal strongly coupled magnetic resonance (CSCMR) system.

FIG. 2A shows a schematic view of a CSCMR system according to an embodiment of the subject invention.

FIG. 2B shows a schematic view of a CSCMR system according to an embodiment of the subject invention.

DETAILED DESCRIPTION

The subject invention provides novel and advantageous systems and methods for wireless power transfer (WPT) via multiple-resonator conformal strongly coupled magnetic resonance (CSCMR). Instead of using a single loop as a resonator, as with related art systems, multiple resonators (e.g., using multiple loops) are used. This leads to lower operating frequency (e.g., 30% or more decrease from the operating frequency of the same size single-resonator system), extended WPT range (e.g., 20% or more increased range compared to the same size single-resonator system), and higher WPT efficiency.

CSCMR is a planar (or approximately planar) strongly coupled magnetic resonance (SCMR) system that has high efficiency. In many embodiments, a printable compact CSCMR structure can include multiple resonators. This structure can lower operational frequency, increase WPT range, and improve efficiency, all while maintaining, or even decreasing, the size of the system. The multiple resonators can be formed in a multilayer configuration.

The resonators can be formed on or in a substrate. In many embodiments, the substrate can be, for example, a circuit board, such as a printed circuit board (PCB). In one embodiment, the PCB can be an FR4 PCB.

A standard SCMR system includes four elements (typically four loops, or two loops and two coils used for resonators). The source element, combined with the transmitter (TX) element, is connected to the power source. The SCMR system achieves good efficiency only when the transmitter and receiver (RX) elements are resonating at the same frequency, at which the resonators exhibit maximum Q-factor. The resonant frequency $f_r$ can be calculated from Equation (1):

$$f_r = \frac{1}{2\pi\sqrt{LC}}, \quad (1)$$

where L and C are the self-inductance and resonating capacitance. The Q-factor at the resonant frequency and lumped capacitor can be calculated using Equations (2) and (3):

$$Q = \frac{2\pi f_r L}{R}. \quad (2)$$

$$C = \frac{1}{4\pi^2 f_r^2 L}. \quad (3)$$

In order to decrease the size of an SCMR system, both the TX resonator and the source can be placed on the same plane to form a new SCMR system, which can be called a conformal strongly coupled magnetic resonator (CSCMR). FIG. 1 shows a schematic view of a CSCMR system. The Q-factor and lumped capacitors, which can be used for the resonators, can be calculated using Equations (2) and (3). CSCMR systems are suitable for portable applications because the volume of the wireless power transmission TX and RX elements can be decreased in size by using a planar structure.

Figure 7:
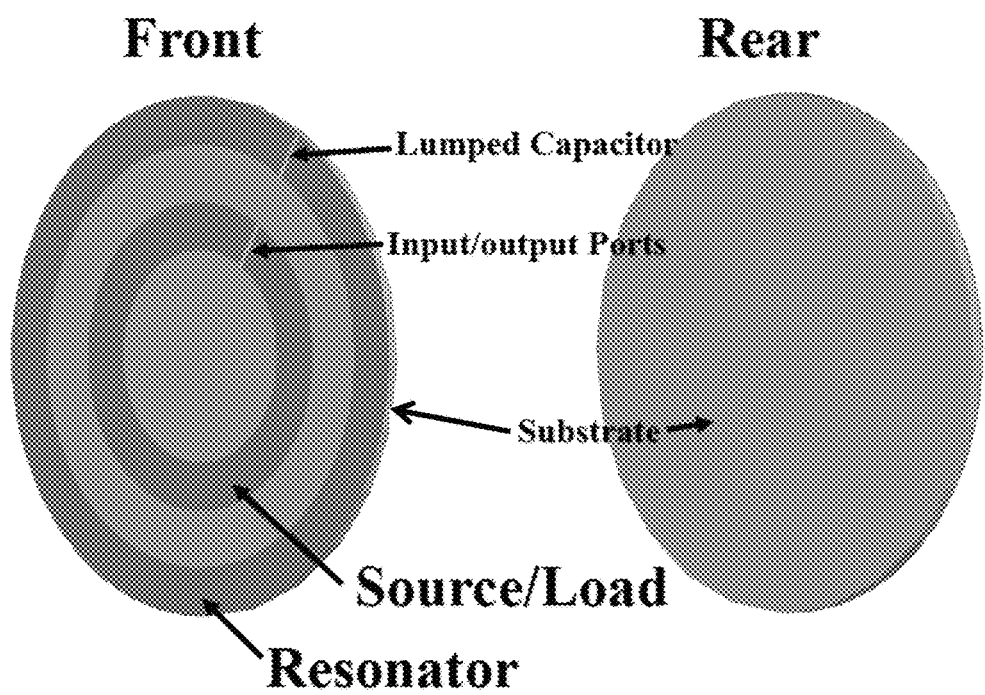
FIG. 7 shows a schematic view of components of an SCMR system.

FIG. 7 shows a schematic view of components of a single-resonator SCMR system. Referring to FIG. 7, the TX or RX element (or both) can include a source (TX) or load (RX), a resonator, input/output ports, and a lumped capacitor formed on one surface of a substrate (e.g., the top or "front" surface, though this designation is arbitrary). The opposite surface of the substrate (e.g., the bottom or "rear" surface) does not have any WPT elements formed thereon.

Figure 8A:
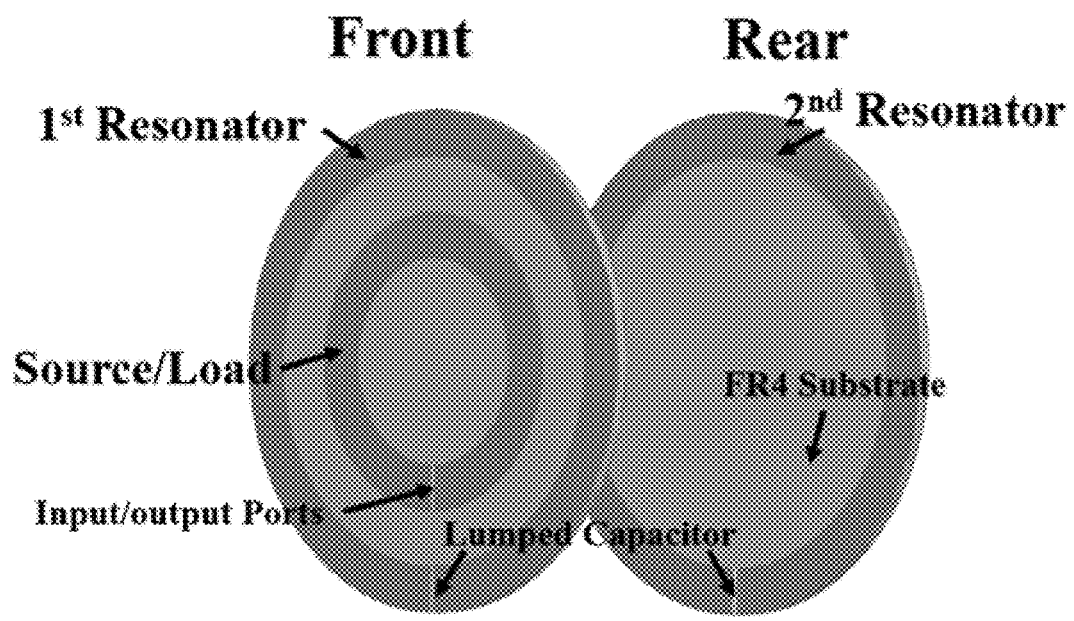
FIG. 8A shows a schematic view of components of a CSCMR system according to an embodiment of the subject invention.
Figure 8B:
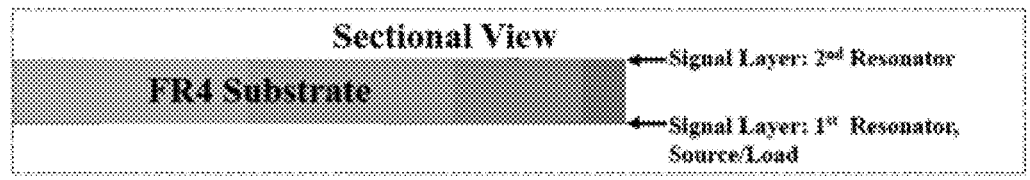
FIG. 8B shows a cross-sectional view of the components shown in FIG. 8A.

FIG. 8A shows a schematic view of components of a TX or RX element of a double-resonator CSCMR system according to an embodiment of the subject invention, and FIG. 8B shows a cross-sectional view of the element of FIG. 8A. Referring to FIGS. 8A and 8B, the TX or RX element is depicted, such that both the TX and RX elements can be as pictured, except the TX would have the source, and the RX would have the load. A first resonator (e.g., a loop coil) can be formed on one surface of a substrate (e.g., the top or "front" surface, though this designation is arbitrary), and a second resonator (e.g., a loop coil) can be formed on the opposite surface of the substrate (e.g., the bottom or "rear" surface). The TX or RX element can also include the source (TX) or load (RX), input/output ports, and a lumped capacitor. The location of these items (source/load, input/output ports, and lumped capacitor) is for demonstrative purposes only and may be moved around or switched to the other side of the substrate. For example, the input/output ports could be on the opposite surface of the substrate from the source/load. In addition, the lumped capacitor can be on only one side of the substrate or may be visible from both surfaces (as depicted in FIG. 8A). Also, the lumped capacitor can be a single capacitor or can be multiple circuit elements (e.g., multiple capacitors) resulting in the capacitance value of the lumped capacitor as discussed herein. Though the substrate is shown as an FR4 substrate, this is for demonstrative purposes only, and embodiments are not limited thereto.

In many embodiments, the resonators on the TX substrate can be the same size (e.g., one or more of loop radius and width) or approximately or about the same size as those on the RX substrate, respectively. That is, a first TX resonator on the TX substrate can be the same size or approximately or about the same size as a first RX resonator on the RX substrate, a second TX resonator on the TX substrate can be the same size or approximately or about the same size as a second RX resonator on the RX substrate, etc. In addition, two or more (or all) of the TX resonators can be the same size as each other, or two or more (or all) of the TX resonators can have different sizes from each other. Two or more (or all) of the RX resonators can be the same size as each other, or two or more (or all) of the RX resonators can have different sizes from each other.

Figure 9A:
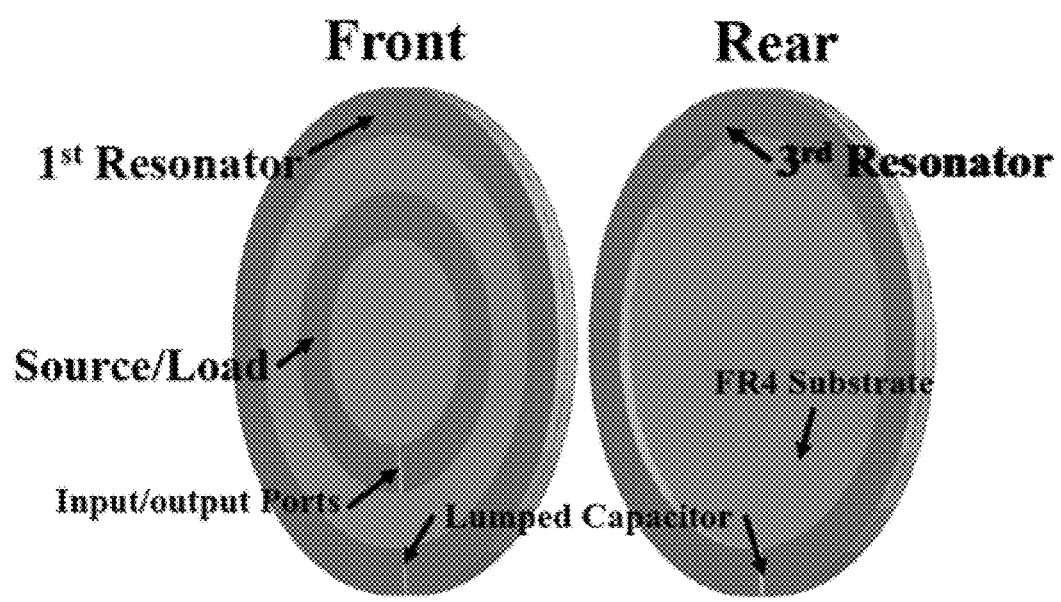
FIG. 9A shows a schematic view of components of a CSCMR system according to an embodiment of the subject invention.
Figure 9B:
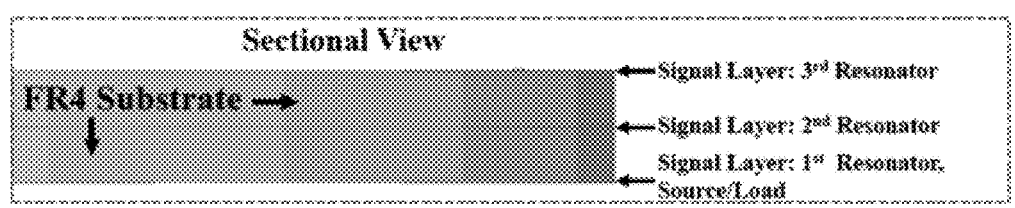
FIG. 9B shows a cross-sectional view of the components shown in FIG. 9A.

FIG. 9A shows a schematic view of components of a TX or RX element of a triple-resonator CSCMR system according to an embodiment of the subject invention, and FIG. 9B shows a cross-sectional view of the element of FIG. 9A. Referring to FIGS. 9A and 9B, the TX or RX element is depicted, such that both the TX and RX elements can be as pictured, except the TX would have the source, and the RX would have the load. A first resonator (e.g., a loop coil) can be formed on one surface of a substrate (e.g., the top or "front" surface, though this designation is arbitrary), and a third resonator (e.g., a loop coil) can be formed on the opposite surface of the substrate (e.g., the bottom or "rear" surface). A second resonator (the labels "first", "second", and "third" are arbitrary) within the substrate, for example as another layer (see also FIG. 9B). The TX or RX element can also include the source (TX) or load (RX), input/output ports, and a lumped capacitor. The location of these items (source/load, input/output ports, and lumped capacitor) is for demonstrative purposes only and may be moved around or switched to the other side of the substrate. For example, the input/output ports could be on the opposite surface of the substrate from the source/load. In addition, the lumped capacitor can be on only one side of the substrate or may be visible from both surfaces (as depicted in FIG. 8A). Also, the lumped capacitor can be a single capacitor or can be multiple circuit elements (e.g., multiple capacitors) resulting in the capacitance value of the lumped capacitor as discussed herein. Though the substrate is shown as an FR4 substrate, this is for demonstrative purposes only, and embodiments are not limited thereto.

Figure 10:
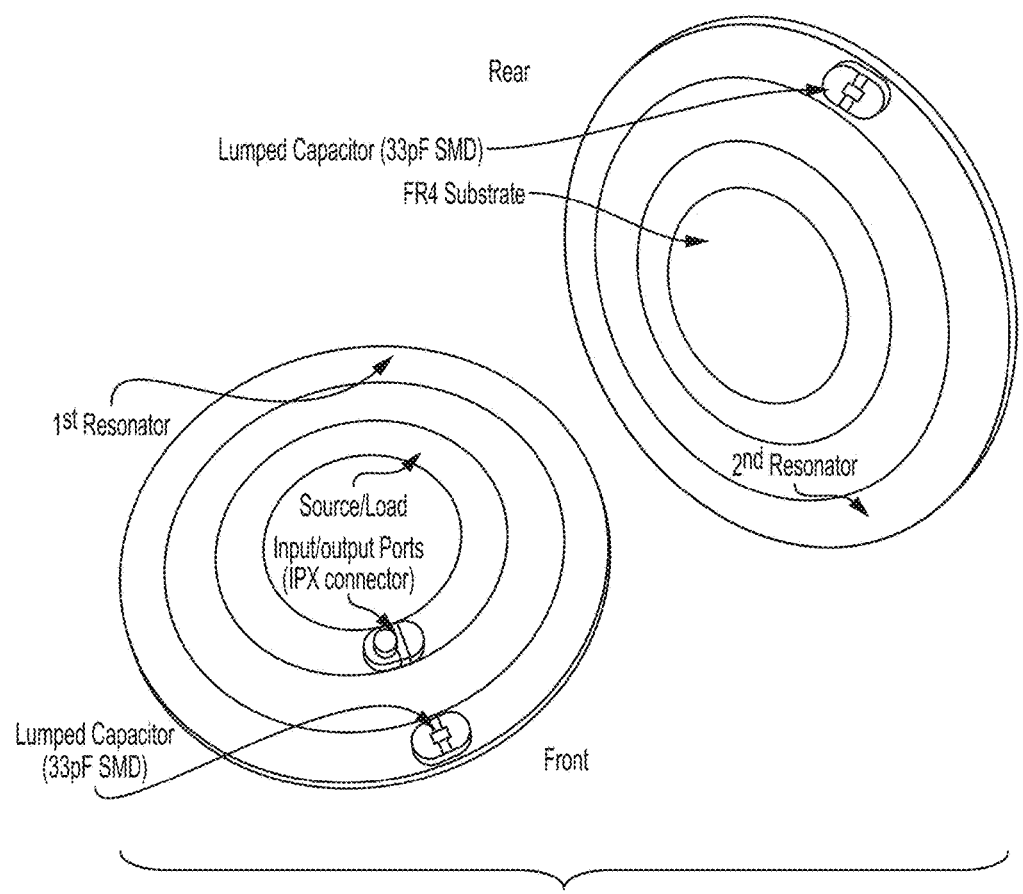
FIG. 10 shows a schematic view of components of a CSCMR system according to an embodiment of the subject invention.

FIG. 10 shows another view of the system of FIGS. 8A and 8B. Though values and types are listed for the lumped capacitor, the substrate, and the input/output ports, this is for demonstrative purposes only, and embodiments are not limited thereto.

Figure 11:
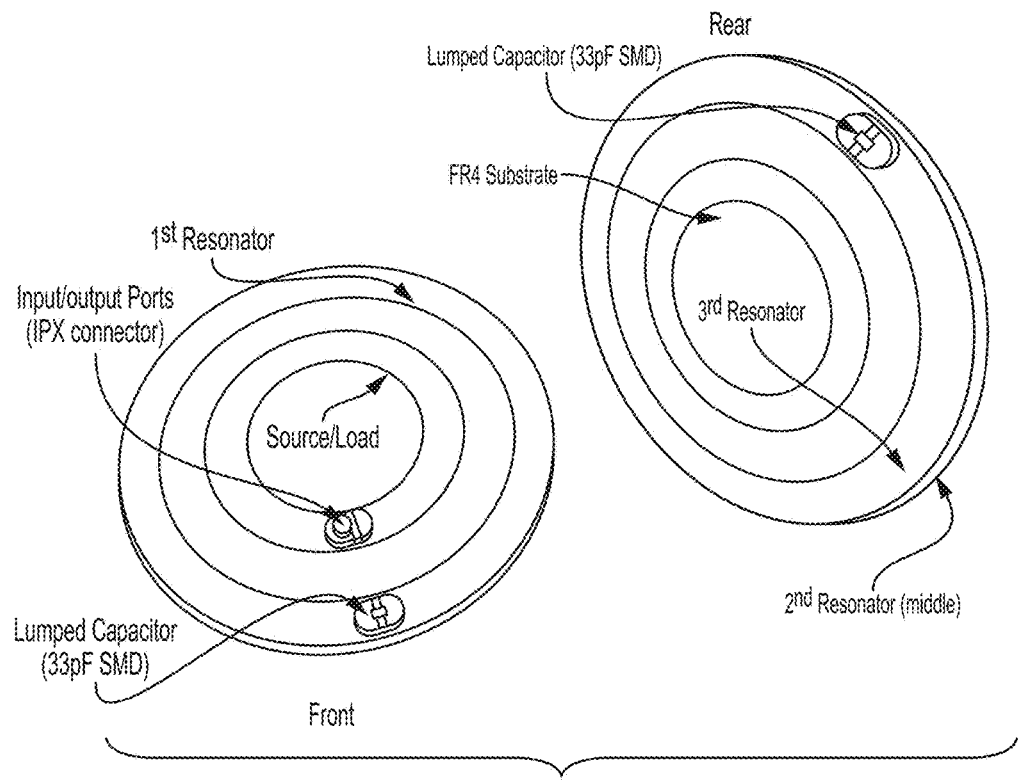
FIG. 11 shows a schematic view of components of a CSCMR system according to an embodiment of the subject invention.

FIG. 11 shows another view of the system of FIGS. 9A and 9B. Though values and types are listed for the lumped capacitor, the substrate, and the input/output ports, this is for demonstrative purposes only, and embodiments are not limited thereto.

The capacitance of the lumped capacitor of the CSCMR system can be, for example, any of the following values, about any of the following values, at least any of the following values, at least about any of the following values, not more than any of the following values, not more than about any of the following values, or within any range having any of the following values as endpoints (with or without "about" in front of one or both of the endpoints), though embodiments are not limited thereto (all numerical values are in picoFarads (pF)): 1, 5, 10, 15, 20, 25, 30, 33, 35, 40, 45, 50, 55, 60, 65, 70, 75, 80, 82, 85, 90, 95, 100, 110, 120, 130, 140, 150, 160, 170, 180, 190, 200, 250, 300, 350, 400, 500, 600, 700, 800, 900, or 1000. For example, capacitance of the lumped capacitor can be 33, 82, 120, 150, or 200.

When the term "about" is used herein, in conjunction with a numerical value, it is understood that the value can be in a range of 95% of the value to 105% of the value, i.e. the value can be +/−5% of the stated value. For example, "about 1 kg" means from 0.95 kg to 1.05 kg.

The radius of each of the TX and RX element of the CSCMR system can be, for example, any of the following values, about any of the following values, at least any of the following values, at least about any of the following values, not more than any of the following values, not more than about any of the following values, or within any range having any of the following values as endpoints (with or without "about" in front of one or both of the endpoints), though embodiments are not limited thereto (all numerical values are in millimeters (mm)): 1, 5, 10, 15, 20, 25, 26, 27, 28, 29, 30, 31, 32, 33, 34, 35, 40, 41, 42, 43, 44, 45, 50, 55, 60, 65, 70, 75, 80, 82, 85, 90, 95, 100, 110, 120, 130, 140, 150, 160, 170, 180, 190, 200, 250, 300, 350, 400, 500, 600, 700, 800, 900, or 1000. The radius of the TX element can be the same as, or different from, that of the RX element. For example, the radius of each of the TX and RX element can be 29 mm, 32 mm, or 42 mm.

The transmission range of the CSCMR system, in which the system can operate at 70% or greater power transfer efficiency while the TX and RX elements are separated by the "transmission range" value, can be, for example, any of the following values, about any of the following values, at least any of the following values, at least about any of the following values, not more than any of the following values, not more than about any of the following values, or within any range having any of the following values as endpoints (with or without "about" in front of one or both of the endpoints), though embodiments are not limited thereto (all numerical values are in millimeters (mm)): 10, 20, 30, 40, 50, 60, 70, 80, 90, 100, 110, 120, 130, 140, 150, 200, 250, 300, 350, 400, 450, 500, 600, 700, 800, 900, or 1000. For example, the transmission range can be at least 60 mm or at least 80 mm.

The operating frequency of the CSCMR system can be, for example, any of the following values, about any of the following values, at least any of the following values, at least about any of the following values, not more than any of the following values, not more than about any of the following values, or within any range having any of the following values as endpoints (with or without "about" in front of one or both of the endpoints), though embodiments are not limited thereto (all numerical values are in megahertz (MHZ)): 1, 2, 3, 4, 5, 6, 7, 8, 9, 10, 15, 20, 25, 30, 35, 39.5, 40, 45, 50, 53.2, 53.8, 55, 60, 62.4, 62.8, 65, 70, 75, 80, 85, 90, 95, 100, 150, 200, 250, 300, 350, 400, 450, 500, 600, 700, 800, 900, or 1000. For example, the operating frequency can be less than 65 MHz.

The width of each resonator can be any suitable value known in the art (e.g., 6 mm or about 6 mm, though embodiments are not limited thereto). The thickness of the substrate can be any suitable value known in the art (e.g., a metal thickness (e.g., copper thickness) of 0.035 mm or about 0.035 mm and/or a dielectric thickness of 1.5 mm or about 1.5 mm, though embodiments are not limited thereto).

Though double-, triple-, and quadruple-resonator systems are explicitly described herein, embodiments of the subject invention are not limited thereto. Additional layers can be included to result in any reasonable number of resonators being present on both the TX and RX elements. That is, CSCMR systems of the subject invention can include TX and RX elements, each having multiple layers (with no limit) to include multiple resonators. For example, each additional layer can introduce an additional resonator.

CSCMR systems of the subject invention can involve tuning the capacitor(s) present on the TX element, the RX element, or both. Such a system, with tunable capacitor(s) can include a single-layer substrate (for the TX element, the RX element, or both individually). By changing the lumped capacitance of the TX element, the RX element, or both, the system can exhibit the improvements described herein, including lower operational frequency, higher efficiency, larger transmission range, and/or smaller size (e.g., radius, thickness, or both). Multi-layer CSCMR systems of the subject invention can also involve tuning the capacitor(s) present on the TX element, the RX element, or both.

Multiple-resonator CSCMR systems of the subject invention can advantageously have a lower operational (or operating) frequency, higher efficiency, and larger transmission range than a single-resonator system of the same radius. In addition, the TX and RX elements of a multiple-resonator CSCMR system of the subject invention can be smaller (e.g., smaller radius) than a single-resonator system having the same operational frequency, transmission range, and/or efficiency. Multiple-resonator CSCMR systems of the subject invention can therefore provide miniaturization and increased efficiency and transmission range compared to related art devices.

In an embodiment, a method of providing WPT can include providing a CSCMR system as described herein and using it for its intended purpose.

In an embodiment, a method of fabricating a CSCMR system can include: forming a first TX resonator on a first surface of a TX substrate; forming a second TX resonator on a second surface of the TX substrate opposite to the first surface of the TX substrate; forming a first RX resonator on a first surface of a RX substrate; and forming a second RX resonator on a second surface of the TX substrate opposite to the first surface of the RX substrate. Alternative to forming the second resonator on the second surface, it can be formed within the substrate as a layer between the first and second surfaces. The TX and RX resonators can respectively correspond to one another. Further elements, such a source (TX) or load (RX), input/output ports (e.g., input ports on the TX and output ports on the RX, or vice versa, or input/output ports on both), and/or a lumped capacitor as described herein can also be formed on the substrates. One or both of the substrates can be, e.g., a PCB such as an FR4 PCB, though embodiments are not limited thereto.

Systems and methods of the subject invention can be used for wireless charging of, for example, mobile devices, implantable devices or sensors, embedded sensors for structural health monitoring of concrete structures and bridges, wearable devices, and healthcare applications.

The subject invention includes, but is not limited to, the following exemplified embodiments.

Embodiment 1

A wireless power transfer (WPT) system, comprising:
a transmitter (TX) element; and
a receiver (RX) element,
wherein the TX element comprises:
a TX lumped capacitor;
a first TX resonator disposed on a first surface of a TX substrate; and
a second TX resonator, wherein the second TX resonator is disposed either on a second surface of the TX substrate opposite to the first surface of the TX substrate or within the TX substrate as a layer between the first and second surfaces of the TX substrate, and
wherein the RX element comprises:
a RX lumped capacitor;
a first RX resonator disposed on a first surface of a RX substrate; and
a second RX resonator, wherein the second RX resonator is disposed either on a second surface of the RX substrate opposite to the first surface of the RX substrate or within the RX substrate as a layer between the first and second surfaces of the RX substrate.

Embodiment 2

The WPT system according to embodiment 1, wherein the TX element further comprises a power source disposed on the first or second surface of the TX substrate.

Embodiment 3

The WPT system according to embodiment 2, wherein the power source is disposed on the first surface of the TX substrate.

Embodiment 4

The WPT system according to embodiment 2, wherein the power source is disposed on the second surface of the TX substrate.

Embodiment 5

The WPT system according to any of embodiments 1-4, wherein the RX element further comprises a load disposed on the first or second surface of the RX substrate.

Embodiment 6

The WPT system according to embodiment 5, wherein the load is disposed on the first surface of the RX substrate.

Embodiment 7

The WPT system according to embodiment 5, wherein the load is disposed on the second surface of the RX substrate.

Embodiment 8

The WPT system according to any of embodiments 1-7, wherein the TX element further comprises TX input/output ports disposed on the first or second surface of the TX substrate.

Embodiment 9

The WPT system according to embodiment 8, wherein the TX input/output ports are disposed on the first surface of the TX substrate.

Embodiment 10

The WPT system according to embodiment 8, wherein the TX input/output ports are on the second surface of the TX substrate.

Embodiment 11

The WPT system according to any of embodiments 1-10, wherein the RX element further comprises RX input/output ports disposed on the first or second surface of the RX substrate.

Embodiment 12

The WPT system according to embodiment 11, wherein the RX input/output ports are disposed on the first surface of the RX substrate.

Embodiment 13

The WPT system according to embodiment 11, wherein the RX input/output ports are on the second surface of the RX substrate.

Embodiment 14

The WPT system according to any of embodiments 1-13, wherein the second TX resonator is disposed on the second surface of the TX substrate.

Embodiment 15

The WPT system according to any of embodiments 1-13, wherein the second TX resonator is disposed within the TX substrate as a layer between the first and second surfaces of the TX substrate.

Embodiment 16

The WPT system according to any of embodiments 1-15, wherein the second RX resonator is disposed on the second surface of the RX substrate.

Embodiment 17

The WPT system according to any of embodiments 1-15, wherein the second RX resonator is disposed within the RX substrate as a layer between the first and second surfaces of the RX substrate.

Embodiment 18

The WPT system according to any of embodiments 1-17, wherein the second TX resonator is disposed within the TX substrate as a layer between the first and second surfaces of the TX substrate, and
wherein the TX element further comprises a third TX resonator disposed on the second surface of the TX substrate.

Embodiment 19

The WPT system according to any of embodiments 1-18, wherein the second RX resonator is disposed within the RX substrate as a layer between the first and second surfaces of the RX substrate, and
wherein the RX element further comprises a third RX resonator disposed on the second surface of the RX substrate.

Embodiment 20

The WPT system according to any of embodiments 1-19, wherein the first TX resonator corresponds in size to the first RX resonator.

Embodiment 21

The WPT system according to any of embodiments 1-20, wherein the second TX resonator corresponds in size to the second RX resonator.

Embodiment 22

The WPT system according to any of embodiments 19-21, wherein the third TX resonator corresponds in size to the third RX resonator.

Embodiment 23

The WPT system according to any of embodiments 1-22, wherein: the TX lumped capacitor comprises a plurality of TX circuit elements having a TX lumped capacitance value; the RX lumped capacitor comprises a plurality of RX circuit elements having a RX lumped capacitance value; or both.

Embodiment 24

The WPT system according to any of embodiments 1-22, wherein: the TX lumped capacitor comprises a plurality of TX capacitors having a TX lumped capacitance value; the RX lumped capacitor comprises a plurality of RX capacitors having a RX lumped capacitance value; or both.

Embodiment 25

The WPT system according to any of embodiments 1-22, wherein: the TX lumped capacitor is a single TX capacitor; the RX lumped capacitor is a single RX capacitor; or both.

Embodiment 26

The WPT system according to any of embodiments 1-25, wherein the TX element and the RX element are physically separated from each other (e.g., in use).

Embodiment 27

The WPT system according to any of embodiments 1-26, which has an operational frequency of less than 65 MHz.

Embodiment 28

The WPT system according to any of embodiments 1-27, which has an efficiency of at least 80% when the TX element and the RX element are separated from each other by at least 60 mm.

Embodiment 29

The WPT system according to any of embodiments 1-28, wherein the radius of the TX element is less than 35 mm, and wherein the radius of the RX element is less than 35 mm.

Embodiment 30

The WPT system according to any of embodiments 1-29, wherein the capacitance of the TX lumped capacitor is less than 85 pF, and wherein the capacitance of the RX lumped capacitor is less than 85 pF.

Embodiment 31

The WPT system according to any of embodiments 1-30, wherein the capacitance of the TX lumped capacitor is the same as that of the RX lumped capacitor.

Embodiment 32

A method of WPT, comprising:
providing the WPT system according to any of embodiments 1-31; and using the WPT system for its intended purpose.

A greater understanding of the present invention and of its many advantages may be had from the following examples, given by way of illustration. The following examples are illustrative of some of the methods, applications, embodiments and variants of the present invention. They are, of course, not to be considered as limiting the invention. Numerous changes and modifications can be made with respect to the invention.

Example 1

A standard, single-resonator, strongly coupled magnetic resonance (SCMR) system was fabricated and tested. The system was similar to the one depicted in FIG. 1.

Figure 3A:
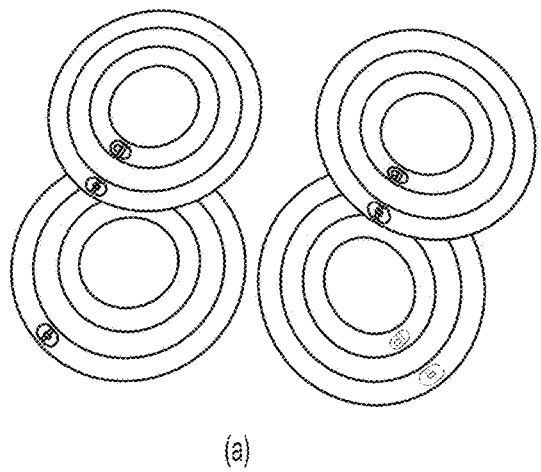
FIG. 3A shows an image of components of a CSCMR system according to an embodiment of the subject invention.
Figure 3B:
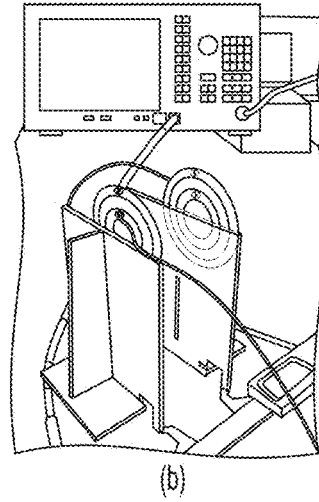
FIG. 3B shows an image of a measurement setup.

An Agilent Vector Network Analyzer (VNA) E5071C was used to measure the power transfer efficiency, and an image of the experimental setup for measurement is shown in FIG. 3B. ANSYS Designer was used for computer simulations of the setup. The Q-factor and lumped capacitors (when needed) were calculated using Equations (2) and (3) described herein, and a 33-pf capacitor was used in the simulation model.

Figure 4:
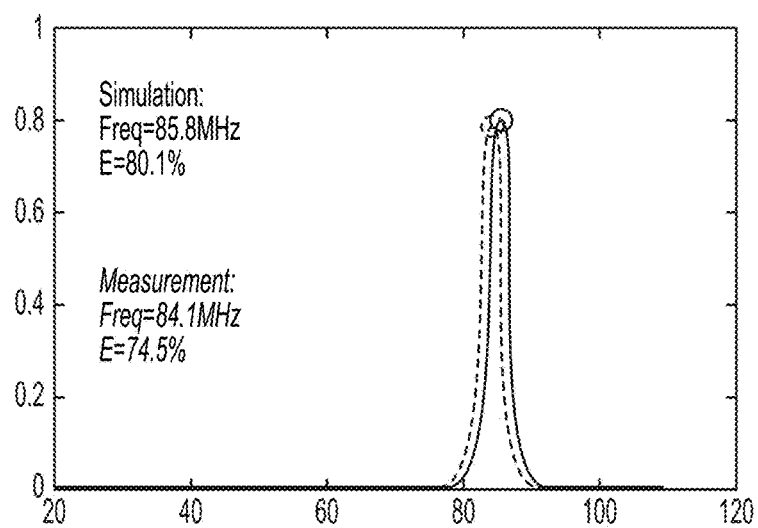
FIG. 4 shows a plot of efficiency versus frequency for a CSCMR system.

FIG. 4 shows a plot of the power transfer efficiency versus frequency (in megahertz (MHz)) for this system at a fixed distance (between TX and RX elements) of 55 mm. Both the measured values (red line; has the left-most peak) and the simulation values (blue line (has the right-most peak) are shown. Referring to FIG. 4, the measurements agree very well with the simulations. The simulation showed a peak efficiency of 80.1%, at 85.8 MHz, and the measurements shows a peak efficiency of 74.5%, at 84.1 MHz.

Example 2

A conformal strongly coupled magnetic resonance (CSCMR) system was fabricated and tested. A schematic of the system is shown in FIG. 2A, and FIG. 3A shows an image of the components of the system. The source and load loops each had a radius of 16 mm. The resonator loops had a radius of 29 mm each, and they were connected to a lumped capacitor. All loops were 6 mm wide. The CSCMR system was fabricated on a one-sided copper FR-4 substrate ($\in$=4.4) with copper thickness of 0.035 mm and dielectric thickness of 1.5 mm. By using the double-sided copper FR-4 substrate ($\in$=4.4) printed circuit board (PCB) with copper thickness 0.035 mm in both sides, another resonator was created on the other side of each of the TX element and the RX element. This second resonator had the same size as the first one (i.e., radius of 29 mm and width of 6 mm).

An Agilent Vector Network Analyzer (VNA) E5071C was used to measure the power transfer efficiency, and an image of the experimental setup for measurement is shown in FIG. 3B. ANSYS Designer was used for computer simulations of the setup. The Q-factor and lumped capacitors (when needed) were calculated using Equations (2) and (3) described herein, and a 33-pf capacitor was used in the simulation model.

Figure 5:
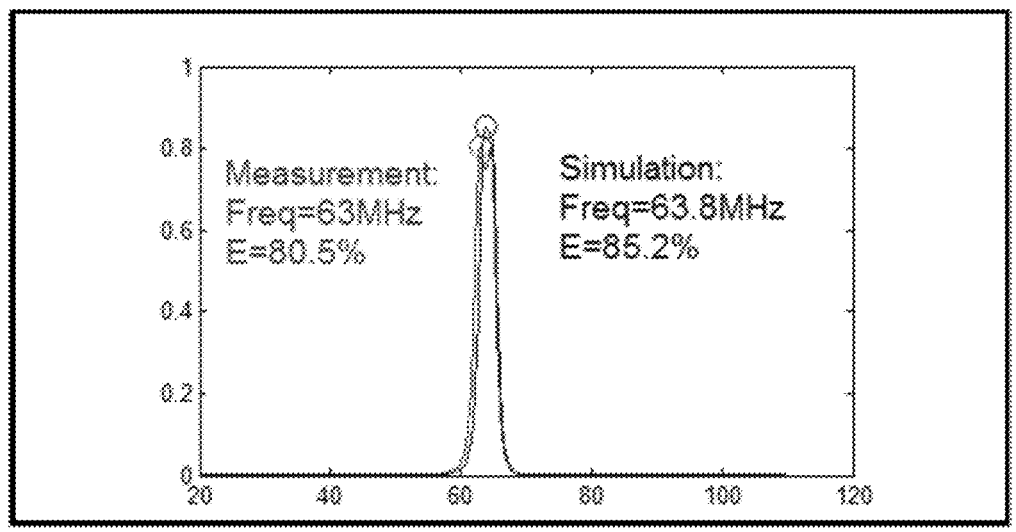
FIG. 5 shows a plot of efficiency versus frequency for a CSCMR system.

FIG. 5 shows a plot of the power transfer efficiency versus frequency (in megahertz (MHz)) for this system at a fixed distance (between TX and RX elements) of 55 mm. Both the measured values (red line; has the left-most peak) and the simulation values (blue line (has the right-most peak) are shown. Referring to FIG. 5, the measurements agree very well with the simulations. The simulation showed a peak efficiency of 85.2%, at 63.8 MHz, and the measurements shows a peak efficiency of 80.5%, at 63 MHz.

By comparing FIG. 5 with FIG. 4 from the single-resonator system in Example 1, it can be seen that the operating frequency of the single-resonator system is significantly higher than that of the double-resonator system (84.1 MHz and 63 MHz, respectively). Therefore, by doubling the resonators on the TX and RX elements, the operating frequency can be shifted downward. Also, the double-resonator CSCMR system exhibits a higher efficiency compared to the single-resonator system.

Figure 6:
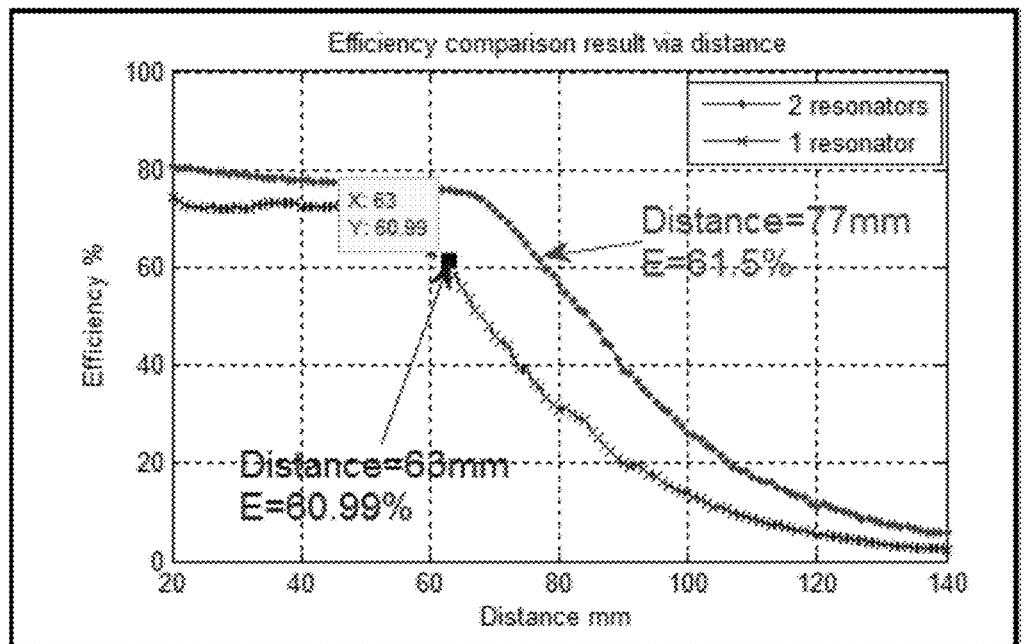
FIG. 6 shows a plot of efficiency versus distance for a CSCMR system.

FIG. 6 shows a plot of the power transfer efficiency versus the distance (between the TX and RX elements) for the single-resonator system of Example 1 (blue, lower line with "x" plot points) and the double-resonator system of this example (red, higher line with circular plot points). Referring to FIG. 6, the double-resonator CSCMR system always exhibits a larger efficiency than the single-resonator system.

Thus, the double-resonator CSCMR system can lower the operational frequency and improve transmitting range and efficiency compared to the single-resonator system of Example 1.

Example 3

Figure 12:
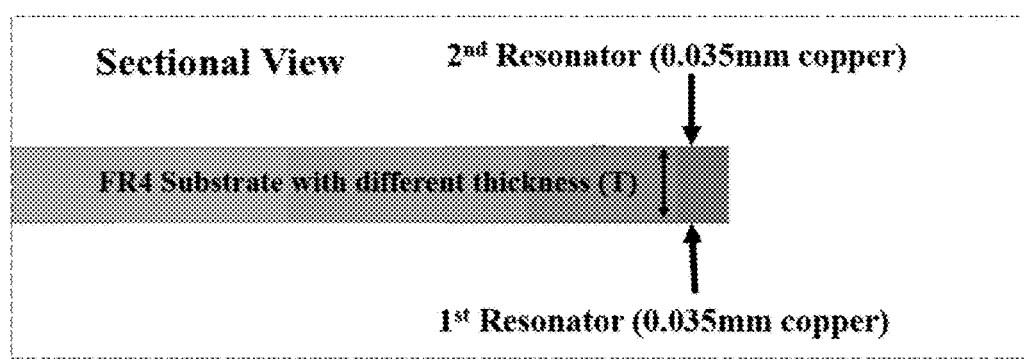
FIG. 12 shows a cross-sectional view of a CSCMR system according to an embodiment of the subject invention.

The effects of board thickness on a double-resonator system were tested. Double-resonator CSCMR systems similar to those in Example 2 were fabricated and tested, each having a different thickness of the board. The systems were tested using the setup and methods as described in Example 2. FIGS. 8A, 10, and 12 show components of the systems.

Figure 13:
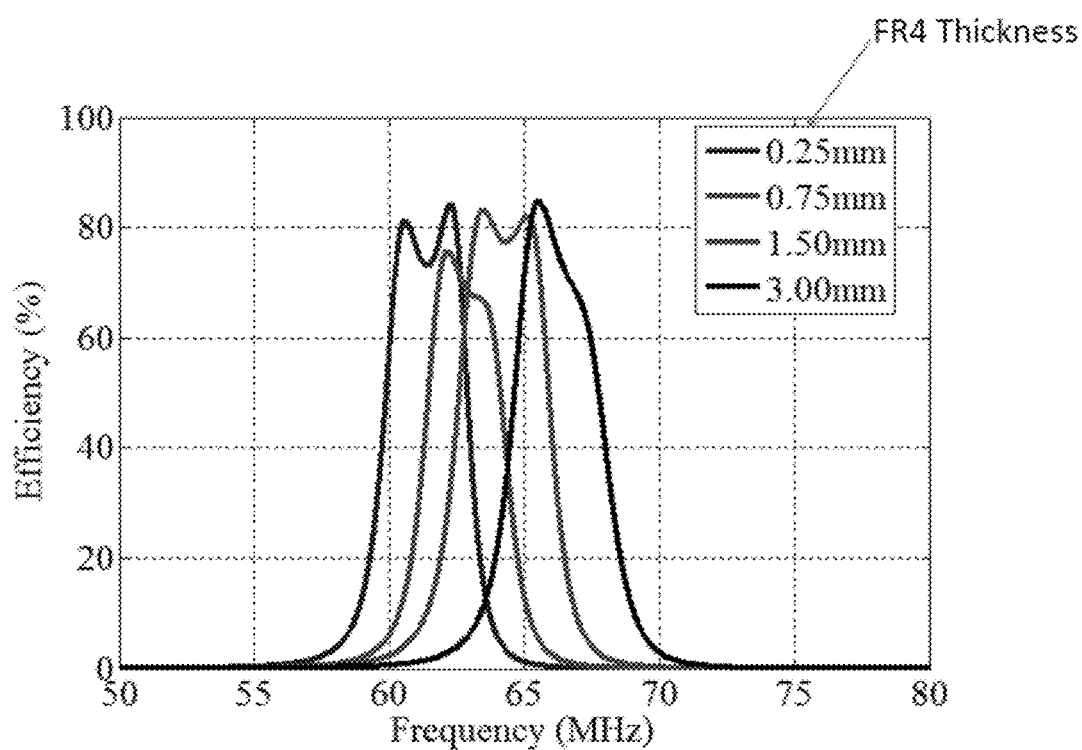
FIG. 13 shows a plot of efficiency versus frequency for a CSCMR system.

FIG. 13 shows a plot of the power transfer efficiency versus frequency (in MHz) for these systems at a fixed distance (between TX and RX elements). Board thicknesses of 0.25 mm (blue line; the curve with the left-most peak), 0.75 mm (green line; the curve with the second-left-most peak), 1.50 mm (red line; the curve with the third-left-most peak), and 3.00 mm (black line; the curve with the right-most peak) are shown. Referring to FIG. 13, the operational frequency decreased as the board became thinner. The peak efficiency was similar for all thickness values.

Example 4

Figure 14:
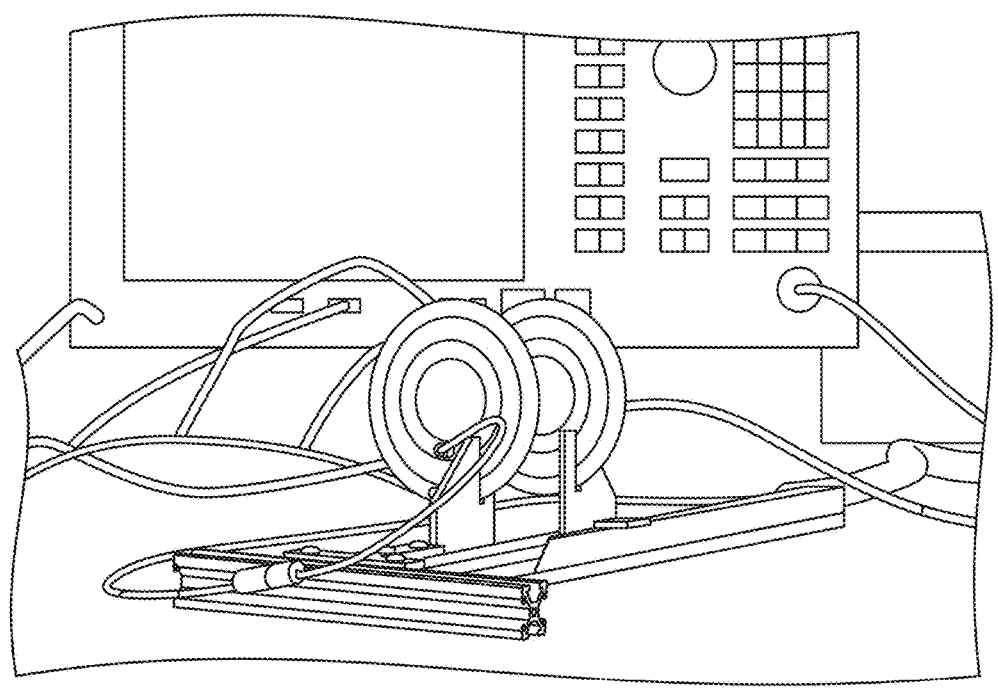
FIG. 14 shows an image of a measurement setup.

A triple-resonator CSCMR system was fabricated and tested, along with a single-resonator system and a double-resonator system. The resonator loops had a radius of 32 mm each. The testing setup and methods were similar to those in Example 2, and FIG. 14 shows an image of the testing setup. The distance (between TX and RX elements) was kept fixed at 60 mm.

Figure 15:
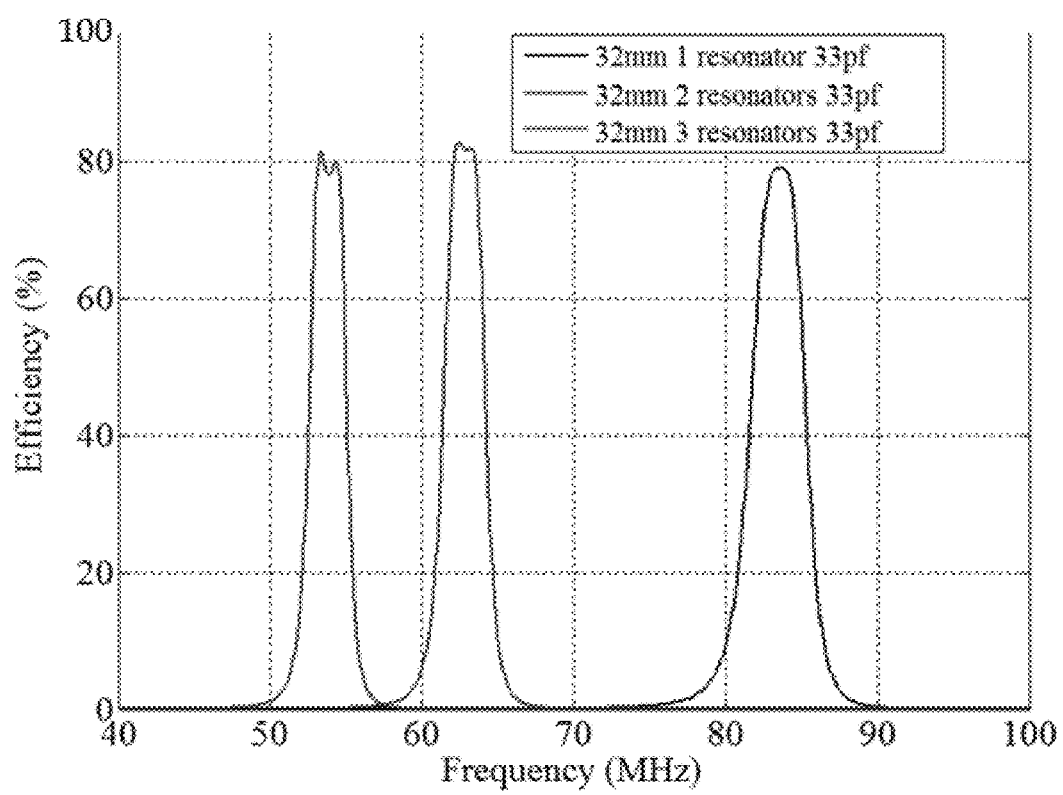
FIG. 15 shows a plot of efficiency versus frequency for a CSCMR system.

FIG. 15 shows a plot of the power transfer efficiency versus frequency (in MHz) for these systems. The red line (left-most peak) is for the triple-resonator system, the green line (middle peak) is for the double-resonator system, and the blue line (right-most peak) is for the single-resonator system. Table 1 shows the operational frequency and frequency shift percentage (relative to the single-resonator system) for these systems.

Referring to FIG. 15 and Table 1, the double-resonator system has a lower operational frequency than the single-resonator system does, and the triple-resonator system has an operation frequency that is 36.5% lower than that of the single-resonator system.

TABLE 1

Frequency and Frequency Shift for Systems of Example 4 At Fixed Distance 60 mm

| Number of Resonators | Frequency (MHz) | Frequency Shift (%) |
| --- | --- | --- |
| 1.00 | 83.80 | 0.00 |
| 2.00 | 62.40 | −25.54 |
| 3.00 | 53.20 | −36.52 |

Table 2 shows the efficiency and efficiency increase percentage (relative to the single-resonator system) for these systems.

TABLE 2

Efficiency and Efficiency Increase for Systems of Example 4
At Fixed Distance 60 mm

| Number of Resonators | Maximum Efficiency | Efficiency Increase (%) |
|---|---|---|
| 1.00 | 79.0 | 0.00 |
| 2.00 | 82.8 | 3.8 |
| 3.00 | 81.5 | 2.5 |

Referring to FIG. 15 and Table 2, both the double-resonator system and the triple-resonator systems have higher efficiencies than the single-resonator system does.

Example 5

Example 4 was repeated, but with a fixed distance (between TX and RX elements) of 80 mm.

Figure 16:
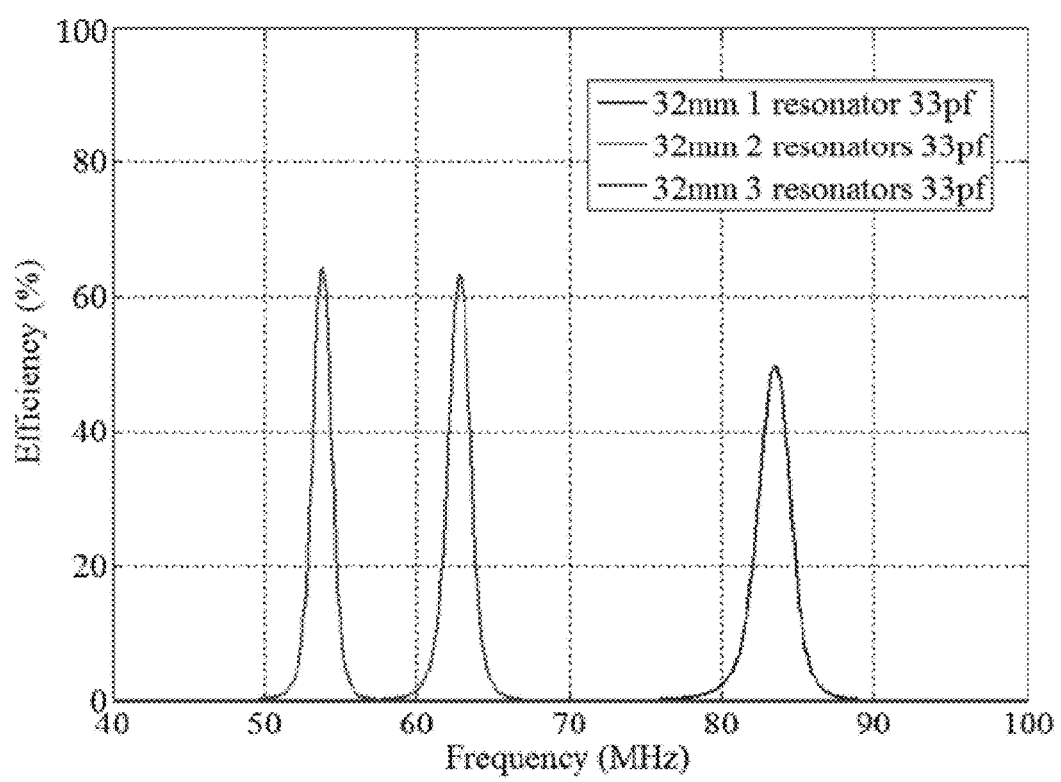
FIG. 16 shows a plot of efficiency versus frequency for a CSCMR system.

FIG. 16 shows a plot of the power transfer efficiency versus frequency (in MHz) for these systems. The red line (left-most peak) is for the triple-resonator system, the green line (middle peak) is for the double-resonator system, and the blue line (right-most peak) is for the single-resonator system. Table 3 shows the operational frequency and frequency shift percentage (relative to the single-resonator system) for these systems.

TABLE 3

Frequency and Frequency Shift for Systems of Example 5
At Fixed Distance 80 mm

| Number of Resonators | Frequency (MHz) | Frequency Shift (%) |
|---|---|---|
| 1.00 | 83.50 | 0.00 |
| 2.00 | 62.80 | −24.79 |
| 3.00 | 53.80 | −35.57 |

Referring to FIG. 16 and Table 3, the double-resonator system has a lower operational frequency than the single-resonator system does, and the triple-resonator system has an operation frequency that is 35.6% lower than that of the single-resonator system.

Table 4 shows the efficiency and efficiency increase percentage (relative to the single-resonator system) for these systems.

TABLE 4

Efficiency and Efficiency Increase for Systems of Example 5
At Fixed Distance 80 mm

| Number of Resonators | maximum Efficiency | Efficiency Increase (%) |
|---|---|---|
| 1.00 | 49.9 | 0.00 |
| 2.00 | 63.2 | 13.3 |
| 3.00 | 64.3 | 14.4 |

Referring to FIG. 16 and Table 4, both the double-resonator system and the triple-resonator systems have higher efficiencies, by more than 13%, than the single-resonator system does.

Example 6

The methodology of Examples 4 and 5 was repeated, but with a changing distance (between TX and RX elements).

Figure 17:
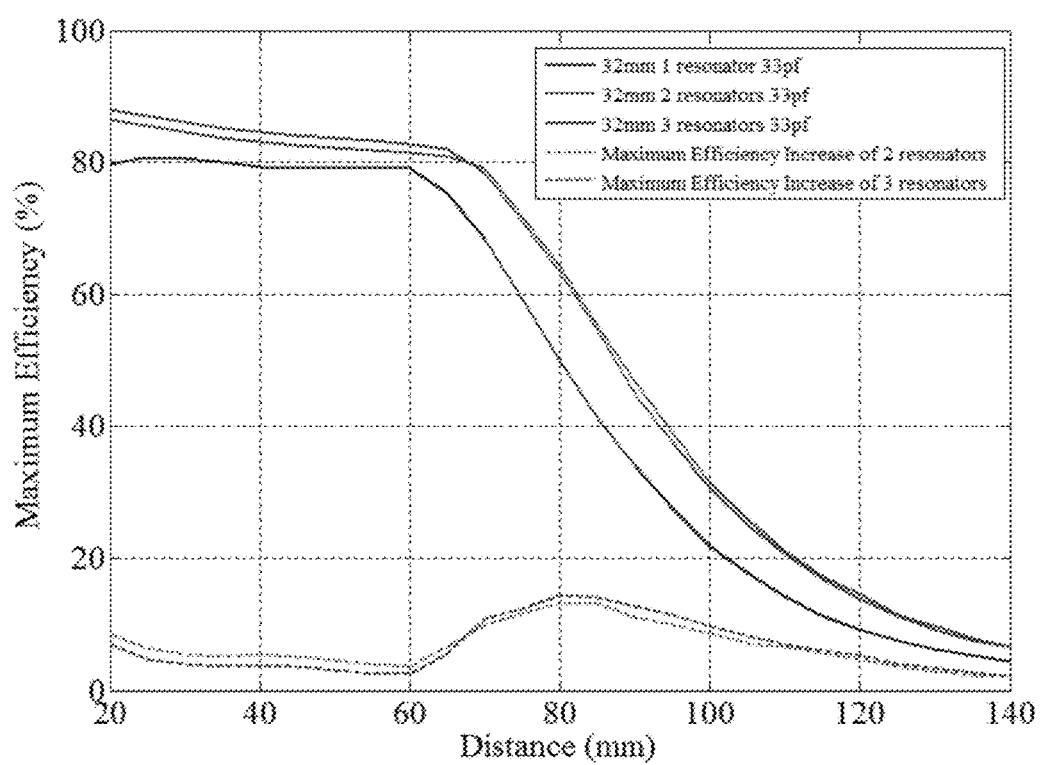
FIG. 17 shows a plot of efficiency versus distance for a CSCMR system.

FIG. 17 shows a plot of the power transfer efficiency versus distance between TX and RX elements (in mm) for these systems. The red solid line (in the vertical middle of the solid lines at the left of the plot) is for the triple-resonator system, the green solid line (uppermost of the solid lines at the left of the plot) is for the double-resonator system, and the blue solid line (lowermost of the solid lines at the left of the plot) is for the single-resonator system. The aqua dashed line (uppermost of the dashed lines at the left of the plot) is for the maximum efficiency increase of the double-resonator system over the single-resonator system, and the purple dashed line (lowermost of the dashed lines at the left of the plot) is for the maximum efficiency increase of the triple-resonator system over the single-resonator system.

Table 5 shows the maximum distance (mm) at which 60% efficiency can be achieved for each of the three systems, as well as the increased distance (in mm and in %) compared to the single-resonator system. Table 6 shows the maximum distance (mm) at which 80% efficiency can be achieved for each of the three systems, as well as the increased distance (in mm and in %) compared to the single-resonator system.

TABLE 5

Distance and Distance Increase for Systems of Example 6
To Achieve 60% Efficiency

| Number of Resonators | Maximum Distance (mm) | Distance Increase (mm) | Distance Increase (%) |
|---|---|---|---|
| 1.00 | 75 | 0 | 0.00 |
| 2.00 | 82 | 7 | 9.33 |
| 3.00 | 83 | 8 | 10.67 |

TABLE 6

Distance and Distance Increase for Systems of Example 6
To Achieve 80% Efficiency

| Number of Resonators | Maximum Distance (mm) | Distance Increase (mm) | Distance Increase (%) |
|---|---|---|---|
| 1.00 | 60 | 0 | 0.00 |
| 2.00 | 70 | 10 | 16.67 |
| 3.00 | 71 | 11 | 18.33 |

Referring to FIG. 17 and Tables 5 and 6, the double- and triple-resonator systems allow for the same efficiency at greater distances, as well as greater efficiency any given distance, compared to the single-resonator system. That is, while maintaining the same area and essentially the same volume, the multi-resonator CSCMR (e.g., double- or triple-resonator system) increases the efficiency and the transmission range compared to the single-resonator system.

Example 7

Figures 18A, 18B:
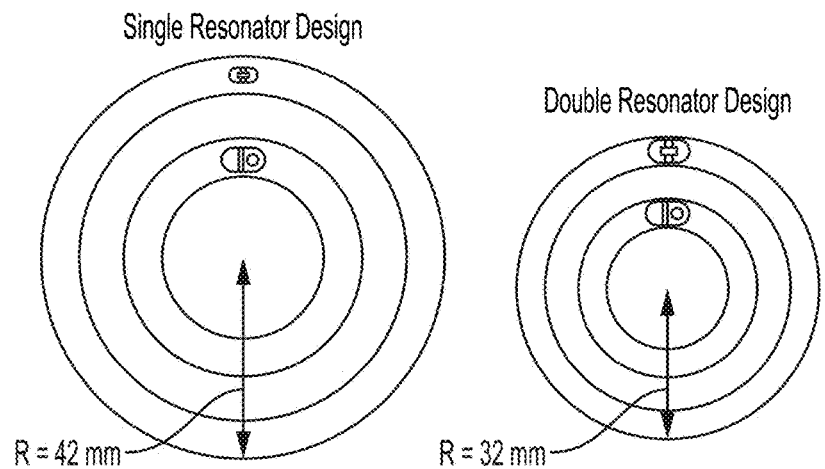
FIG. 18A shows an image of components of an SCMR system.
FIG. 18B shows an image of components of a CSCMR system.

A double-resonator CSCMR system (radius of 32 mm) was compared with a larger single-resonator system (radius of 42 mm) at a fixed distance (between the TX and RX elements) of 60 mm. The single-resonator frequency used a 47-pf capacitor, and the double-resonator system used a 33-pf capacitor. FIG. 18A shows an image of the single-resonator design, and FIG. 18B shows an image of the double-resonator design. Table 7 shows the radius, area, and size reduction factor (compared with the single-resonator system) of these systems. Table 8 shows the operational frequency and maximum efficiency of these systems.

TABLE 7

Sizes of the Systems of Example 7

| Number of Resonators | Radius (mm) | Area (mm²) | Size Reduction Factor |
|---|---|---|---|
| 1.0 | 42.0 | 5541.8 | 1.0 |
| 2.0 | 32.0 | 3217.0 | 1.72 |

TABLE 8

Operating Frequency and Maximum Efficiency of the Systems of Example 7 At Fixed Distance 60 mm

| Number of Resonators | Frequency (MHz) | Efficiency (%) |
|---|---|---|
| 1.00 | 59.9 | 83.37 |
| 2.00 | 62.4 | 82.80 |

Figure 19:
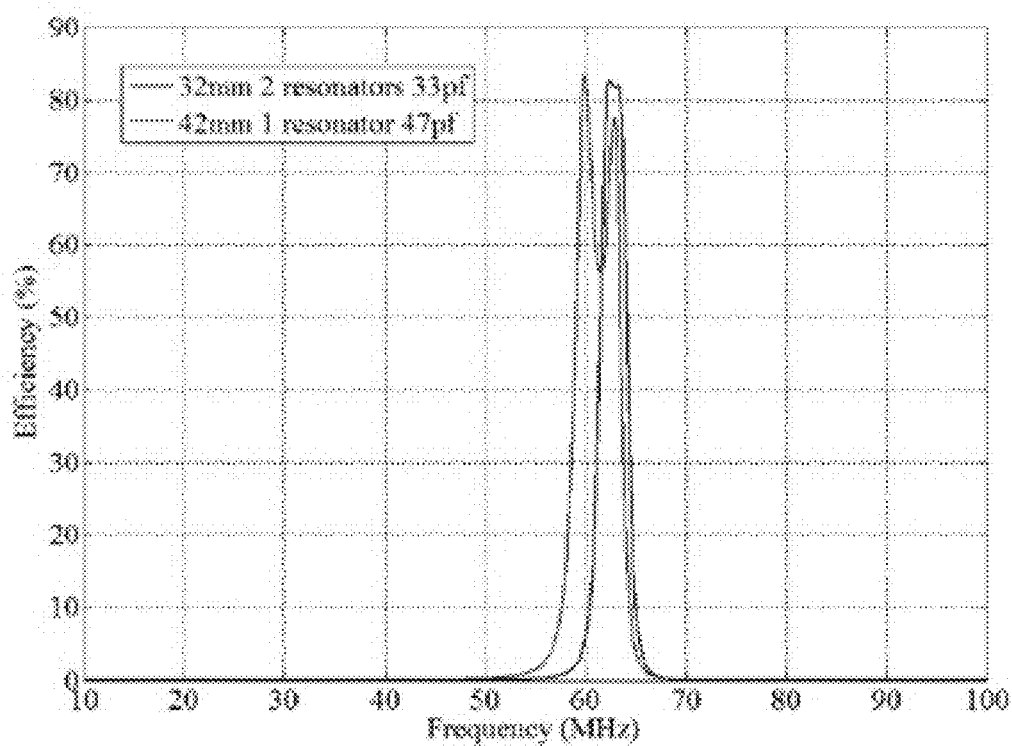
FIG. 19 shows a plot of efficiency versus frequency for a CSCMR system.

FIG. 19 shows a plot of the power transfer efficiency versus frequency (in MHz) for these systems. The green line (left-most peak) is for the single-resonator system, and the blue line (right-most peak) is for the single-resonator system. Referring to FIG. 19 and Tables 7 and 8, the double-resonator system achieves approximately the same operating frequency and efficiency while occupying an area that is 1.72 times smaller than that of the single-resonator system (i.e., the area of the double-resonator system is −58% of that of the single-resonator system).

Example 8

Figure 20:
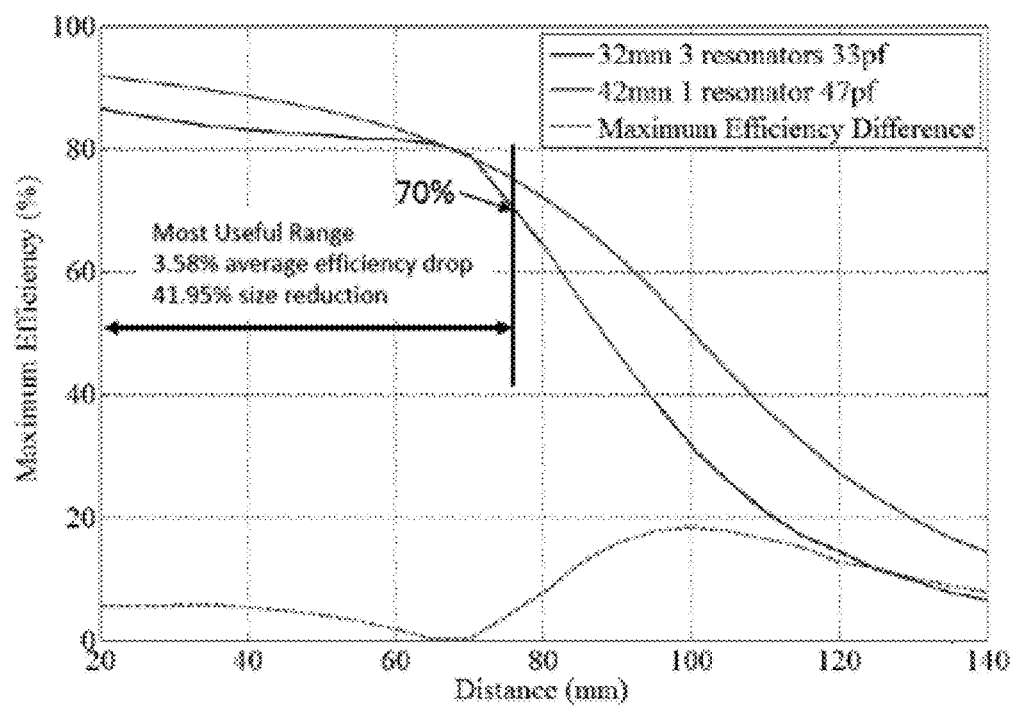
FIG. 20 shows a plot of efficiency versus distance for a CSCMR system.

Example 7 was repeated, but with a changing distance (between TX and RX elements). FIG. 20 shows a plot of the maximum power transfer efficiency versus distance between TX and RX elements (in mm) for the single- and double-resonator systems. The green solid line (uppermost of the solid lines at the left of the plot) is for the single-resonator system, and the blue solid line (lowermost of the solid lines at the left of the plot) is for the double-resonator system. The red dashed line is for the maximum efficiency difference between the double-resonator system and the single-resonator system. Table 9 shows the average efficiency difference (%) in the 20 mm to 140 mm distance range, and the average efficiency drop in the 70% and higher efficiency range, both as a comparison to the single-resonator system. Table 9 also shows the size savings as a comparison to the single-resonator system.

TABLE 9

Efficiency Difference and Size Difference of the Systems of Example 7

| Radius (mm) | Average Efficiency Difference in 20 mm~140 mm range (%) | Average Efficiency Drop in 70% up range (%) | Size Save (%) |
|---|---|---|---|
| 42 | 0.00 | 0.00 | 0.00 |
| 32 | 8.82 | 3.58 | 41.95 |

Referring to FIG. 20 and Table 9, a small efficiency difference exists while the double-resonator design provides a significant reduction in area. For the most useful transmission range, the double-resonator CSCMR provides a ~42% area reduction compared to the area needed by the single-resonator design, with an average drop in efficiency of only 3.58%.

Example 9

Figure 21:
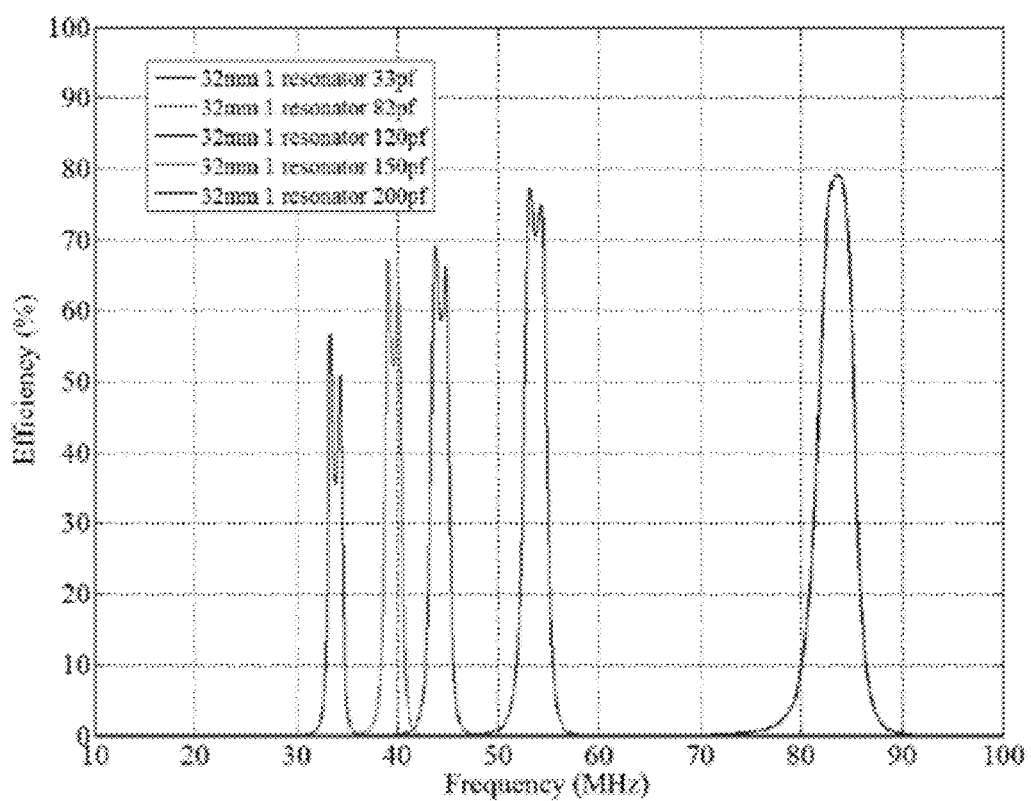
FIG. 21 shows a plot of efficiency versus frequency for a CSCMR system.

A single-resonator system was tested, using different capacitor values, at a fixed distance (between TX and RX elements) of 60 mm. The radius of the resonator loops was 32 mm. FIG. 21 shows a plot of the power transfer efficiency versus frequency (in MHz) for these systems. The purple line (left-most peak) is for a 200-pf capacitor, the aqua line (second-left-most peak) is for a 150-pf capacitor, the red line (third-left-most peak) is for a 120-pf capacitor, the green line (fourth-left-most peak) is for a 82-pf capacitor, and the blue line (right-most peak) is for a 33-pf capacitor. Referring to FIG. 21, in order to maintain a maximum efficiency of at least 70%, the capacitance must stay below 82 pF, and, therefore, the lowest frequency that the single-resonator system was able to achieve by tuning the capacitor was 53.2 MHz.

Example 10

Figure 22:
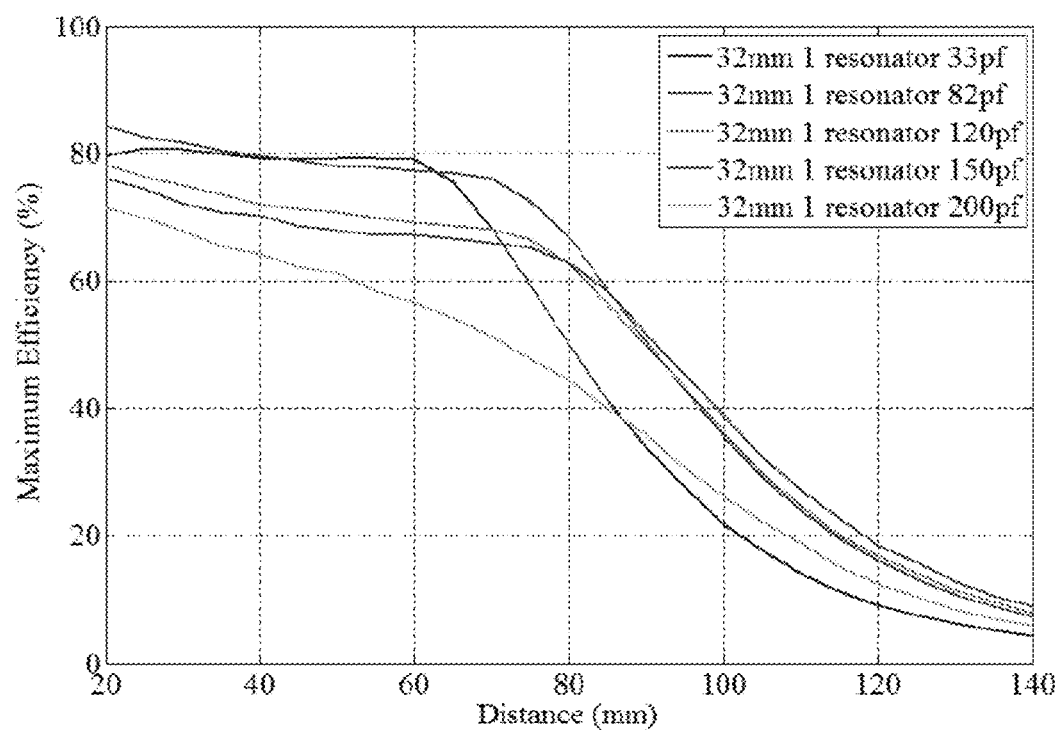
FIG. 22 shows a plot of efficiency versus distance for a CSCMR system.

Example 9 was repeated, but with a changing distance (between TX and RX elements). FIG. 22 shows a plot of the maximum power transfer efficiency versus distance between TX and RX elements (in mm) for the single-resonator system. The blue line (second-uppermost at the left of the plot) is for the 33-pf capacitor, the green line (uppermost at the left of the plot) is for the 82-pf capacitor, the aqua line (third-uppermost at the left of the plot) is for the 120-pf capacitor, the purple line (fourth-uppermost at the left of the plot) is for the 120-pf capacitor, and the tan line (lowermost at the left of the plot) is for the 200-pf capacitor. Referring to FIG. 22, when the capacitance increases higher than 82 pF in an effort to reduce the operating frequency, the efficiency drops significantly.

Example 11

Figure 23:
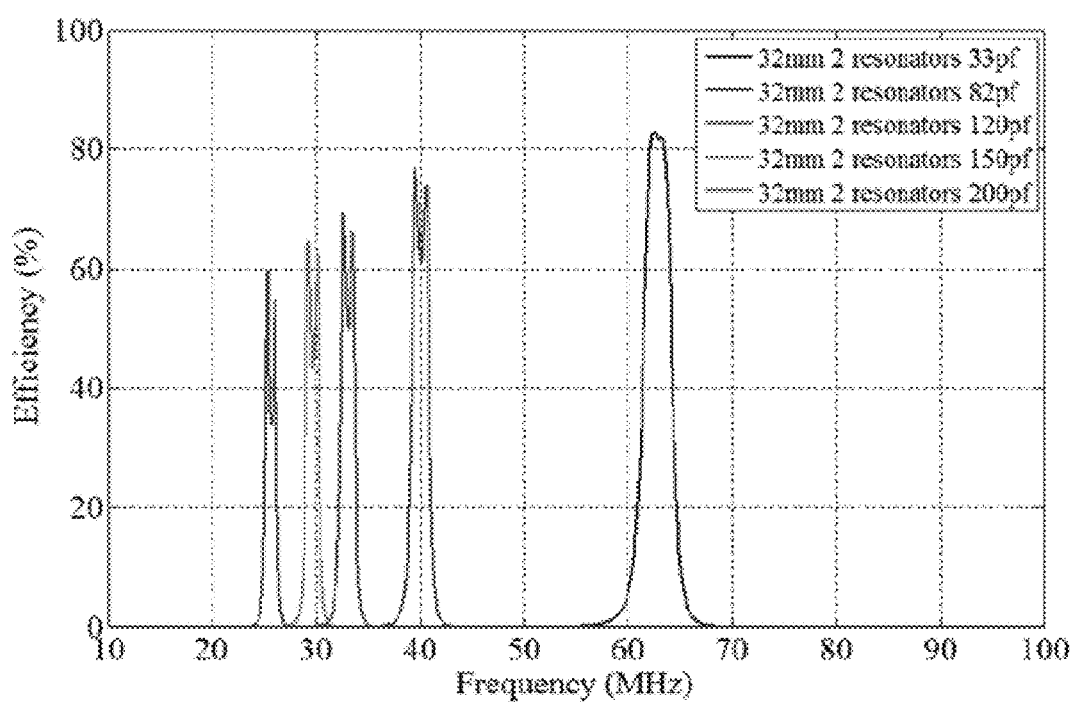
FIG. 23 shows a plot of efficiency versus frequency for a CSCMR system.

Example 9 was repeated, but with a double-resonator system instead of a single-resonator system. FIG. 23 shows a plot of the power transfer efficiency versus frequency (in MHz) for these systems. The purple line (left-most peak) is for a 200-pf capacitor, the aqua line (second-left-most peak) is for a 150-pf capacitor, the red line (third-left-most peak) is for a 120-pf capacitor, the green line (fourth-left-most peak) is for a 82-pf capacitor, and the blue line (right-most peak) is for a 33-pf capacitor. Referring to FIG. 22, in order to maintain a maximum efficiency of at least 70%, the capacitance must stay below 82 pF, and the lowest frequency that the double-resonator system was able to achieve by tuning the capacitor was 39.5 MHz., which is 25.7% lower than that achieved in the single-resonator design.

Figure 24:
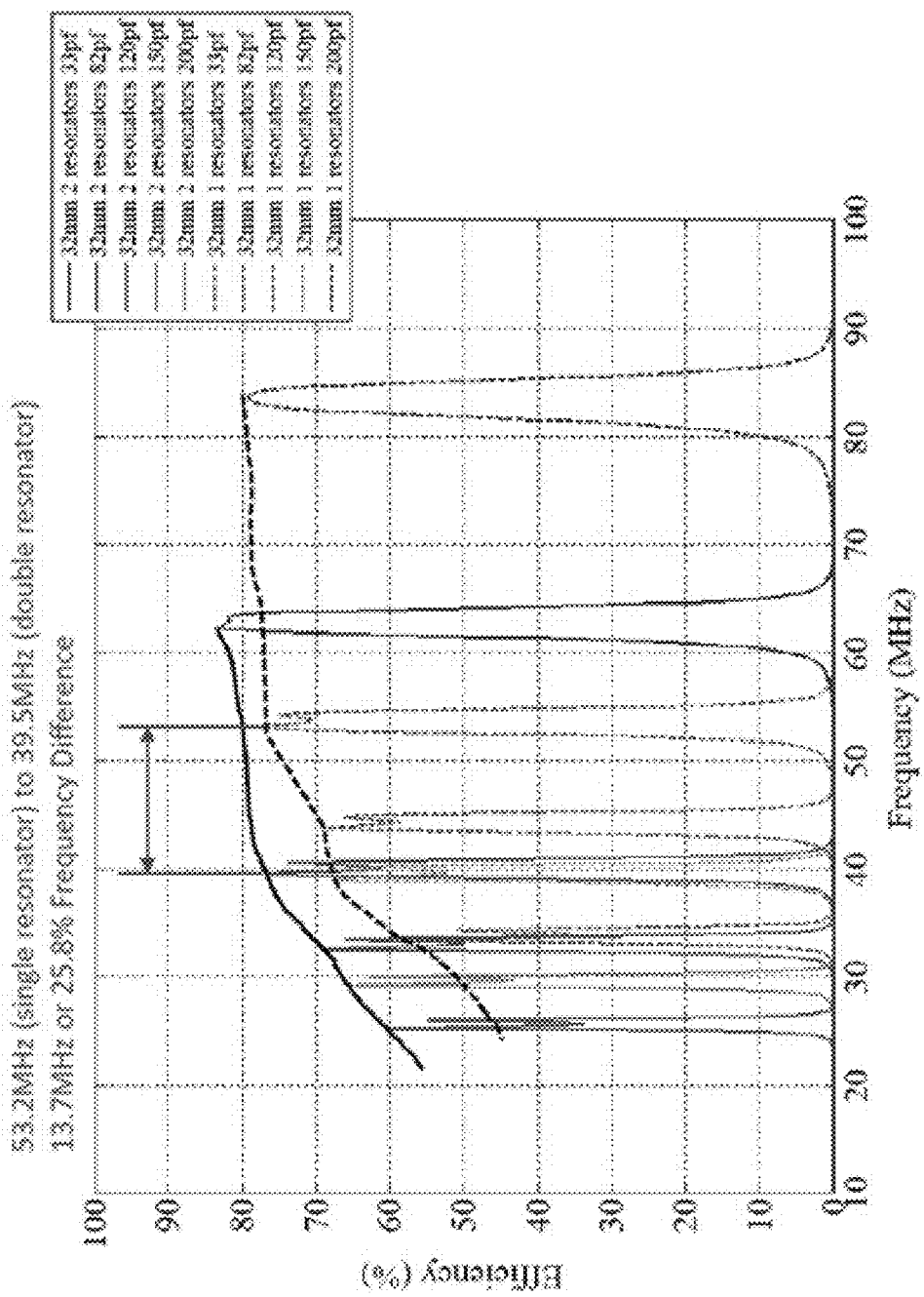
FIG. 24 shows a plot of efficiency versus frequency for a CSCMR system.

FIG. 24 shows a plot of the power transfer efficiency versus frequency (in MHz) for the systems of Example 9 and Example 11. The purple solid line (left-most peak of the solid lines) is for a 200-pf capacitor in the double-resonator system, the aqua solid line (second-left-most peak of the solid lines) is for a 150-pf capacitor in the double-resonator system, the red solid line (third-left-most peak of the solid lines) is for a 120-pf capacitor in the double-resonator system, the green solid line (fourth-left-most peak of the solid lines) is for a 82-pf capacitor in the double-resonator system, and the blue solid line (right-most peak of the solid lines) is for a 33-pf capacitor in the double-resonator system. The purple dashed line (left-most peak of the dashed lines) is for a 200-pf capacitor in the single-resonator system, the aqua dashed line (second-left-most peak of the dashed lines) is for a 150-pf capacitor in the single-resonator system, the red dashed line (third-left-most peak of the dashed lines) is for a 120-pf capacitor in the single-resonator system, the green dashed line (fourth-left-most peak of the dashed lines) is for a 82-pf capacitor in the single-resonator system, and the blue dashed line (right-most peak of the dashed lines) is for a 33-pf capacitor in the single-resonator system. FIG. 24 emphasizes the decrease in operational frequency between the single- and double-resonator systems.

Example 12

A single-resonator system and a double-resonator system were design-tuned to operate at approximately the same frequency and then tested for efficiency at varying distances (between the TX and RX elements). The resonator loops had a radius of 32 mm.

Figure 25A:
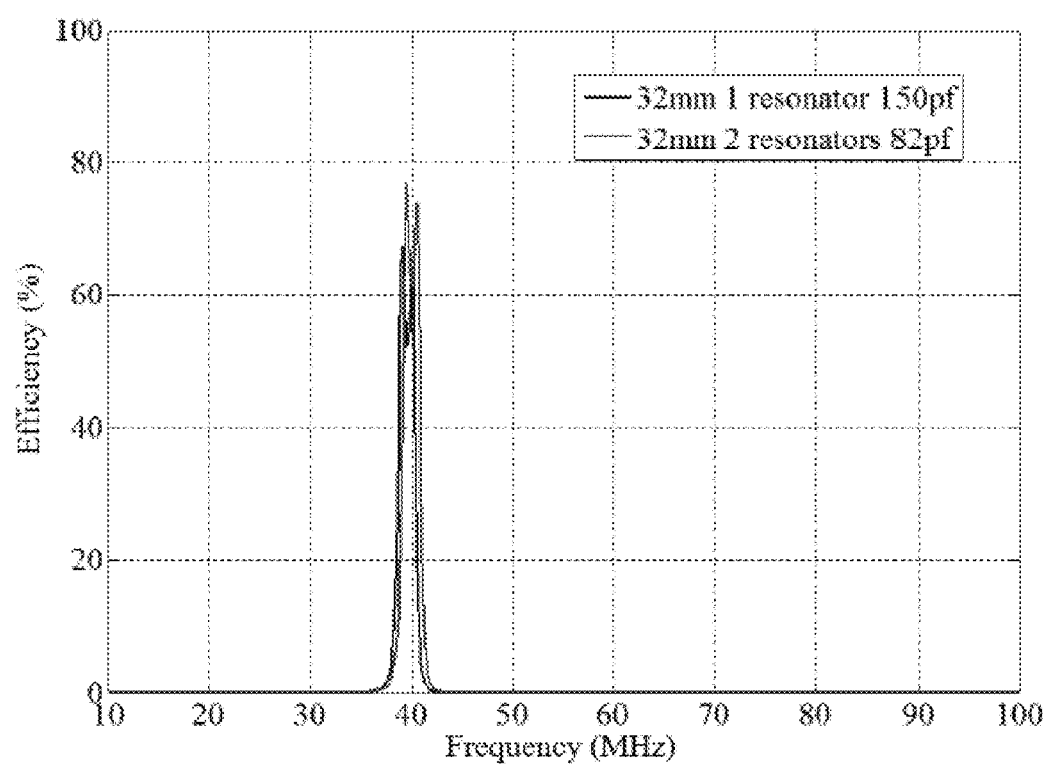
FIG. 25A shows a plot of efficiency versus frequency for a CSCMR system.

The single-resonator system had a 150-pf capacitor, and the double-resonator system had a 82-pf capacitor. FIG. 25A shows a plot of the efficiency versus frequency (in MHz) for these systems. The blue line (lower peak) is for the single-resonator system, and the green line (higher peak) is for the double-resonator system. Referring to FIG. 25A, the operational frequency for both of these resonators was 40 MHz or about 40 MHz.

Figure 25B:
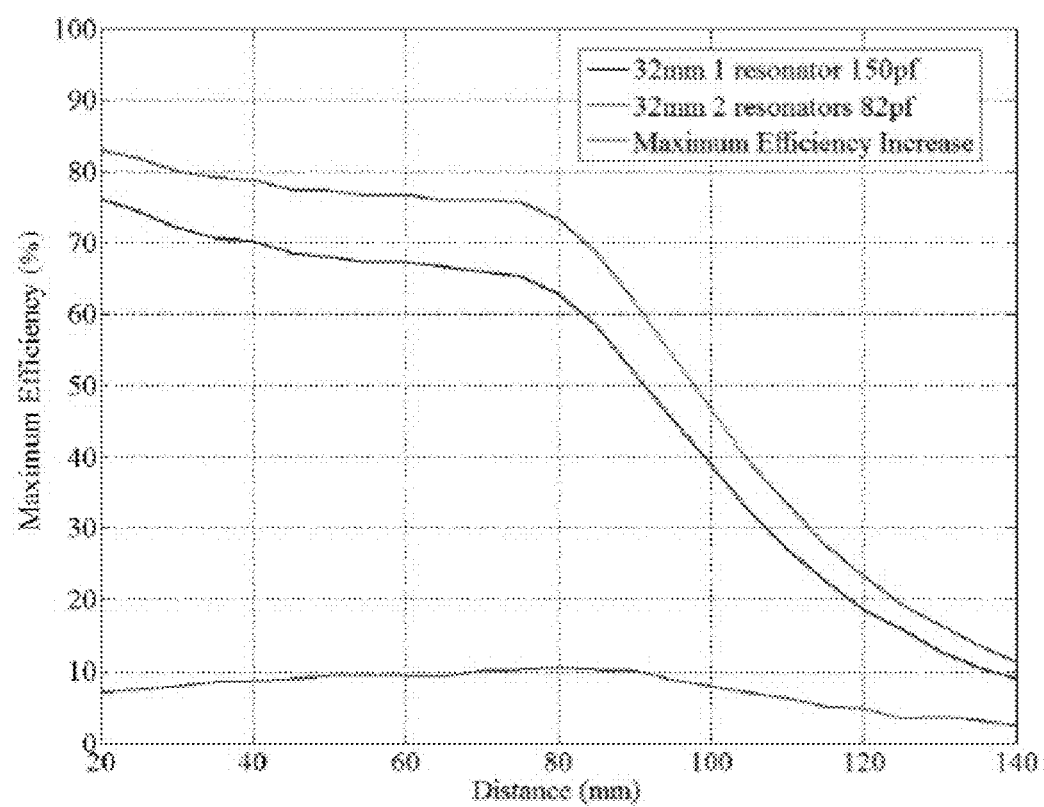
FIG. 25B shows a plot of efficiency versus distance for a CSCMR system.

FIG. 25B shows a plot of the maximum power transfer efficiency versus distance between TX and RX elements (in mm) for the single- and double-resonator systems. The green line (uppermost at the left of the plot) is for the double-resonator system, the blue line (vertically middle between the lines at the left of the plot) is for the single-resonator system, and the red line is for the maximum efficiency increase of the double-resonator system over the single-resonator system. Referring to FIG. 25B, at 40 MHz, the double-resonator system exhibits approximately 10% higher efficiency than the single-resonator system for almost all distances tested.

Example 13

Figure 26A:
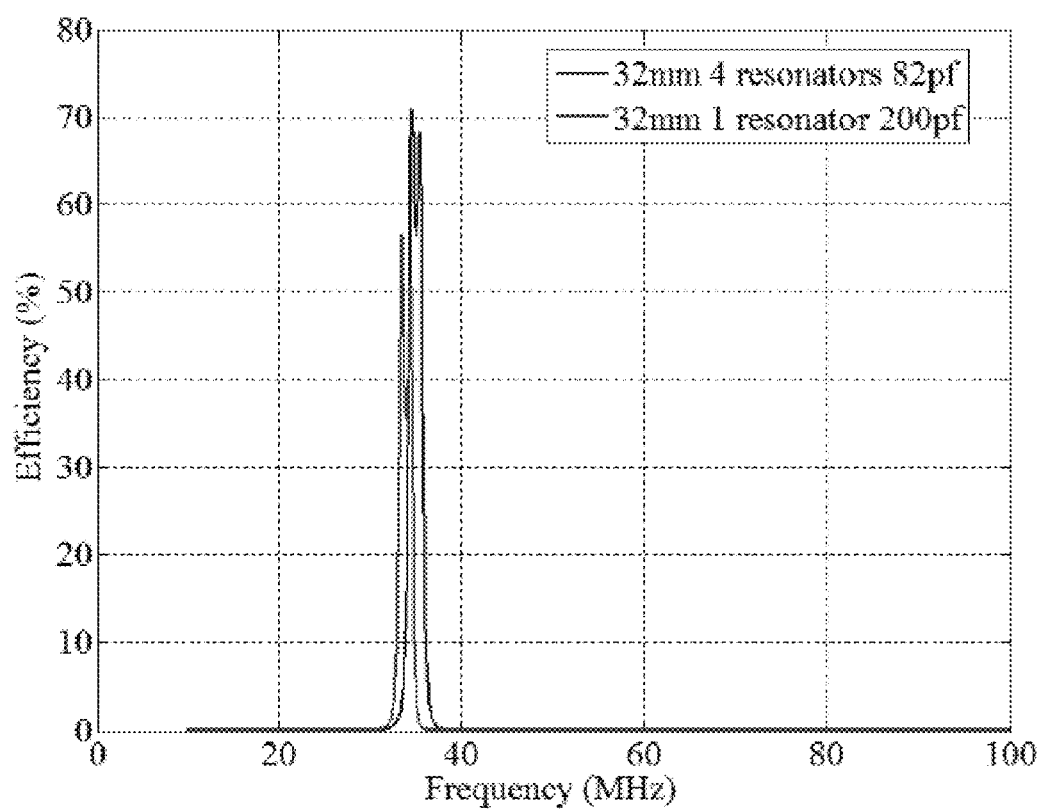
FIG. 26A shows a plot of efficiency versus frequency for a CSCMR system.

A single-resonator system and a quadruple-resonator system were design-tuned to operate at approximately the same frequency and then tested for efficiency at varying distances (between the TX and RX elements). The resonator loops had a radius of 32 mm. The single-resonator system had a 200-pf capacitor, and the quadruple-resonator system had a 82-pf capacitor. FIG. 26A shows a plot of the efficiency versus frequency (in MHz) for these systems. The green line (lower peak) is for the single-resonator system, and the blue line (higher peak) is for the quadruple-resonator system. Referring to FIG. 26A, the operational frequency for both of these resonators was 35 MHz or about 35 MHz.

Figure 26B:
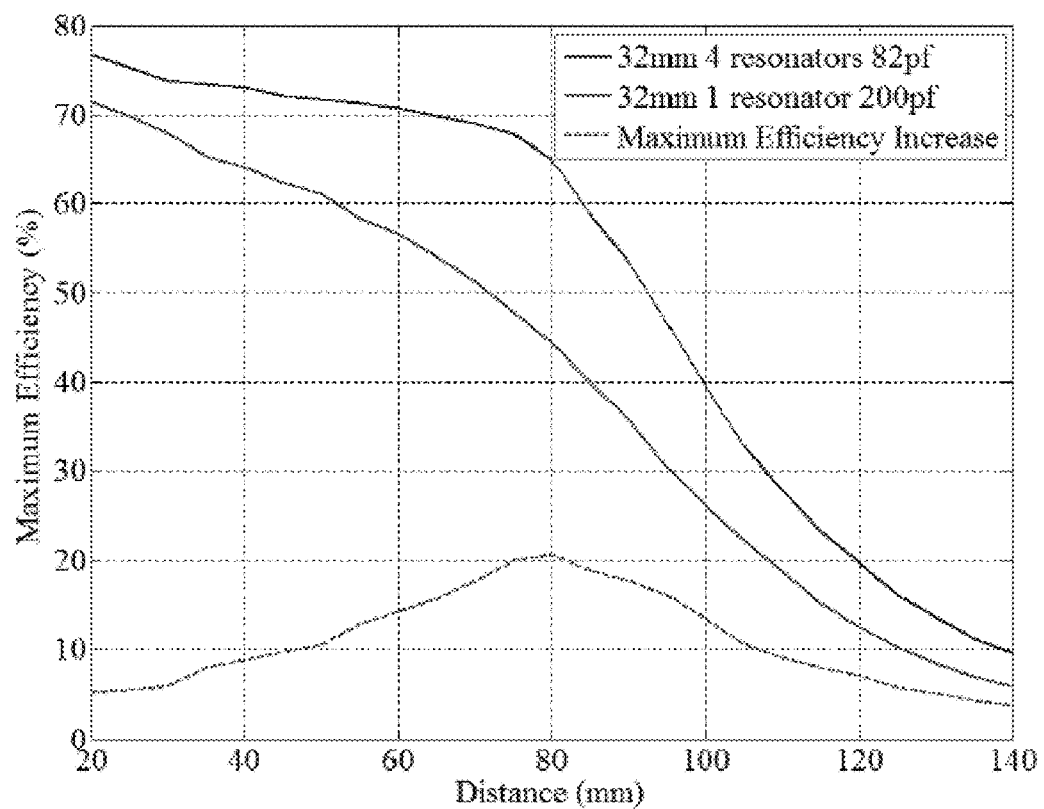
FIG. 26B shows a plot of efficiency versus distance for a CSCMR system.

FIG. 26B shows a plot of the maximum power transfer efficiency versus distance between TX and RX elements (in mm) for the single- and quadruple-resonator systems. The blue solid line (uppermost of the solid lines at the left of the plot) is for the quadruple-resonator system, the green solid line (lowermost of the solid lines at the left of the plot) is for the single-resonator system, and the red dashed line is for the maximum efficiency increase of the quadruple-resonator system over the single-resonator system. Referring to FIG. 26B, at 35 MHz, the quadruple-resonator system exhibits approximately 15% higher efficiency than the single-resonator system for almost all distances tested. The maximum efficiency increase is about 20% at a distance (between the TX and RX elements) of 80 mm.

Example 14

Figure 27:
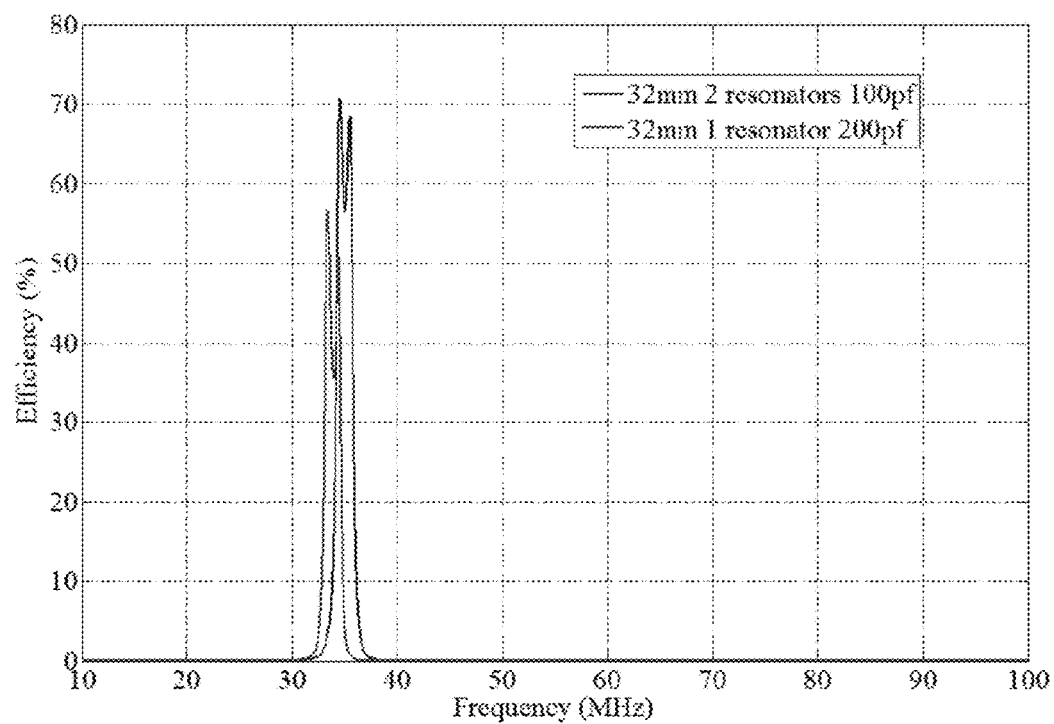
FIG. 27 shows a plot of efficiency versus frequency for a CSCMR system.

A single-resonator system and a double-resonator system were design-tuned to operate at approximately the same frequency and then tested for efficiency at varying distances (between the TX and RX elements). The resonator loops had a radius of 32 mm. The single-resonator system had a 200-pf capacitor, and the double-resonator system had a 100-pf capacitor. FIG. 27 shows a plot of the efficiency versus frequency (in MHz) for these systems. The green line (lower peak) is for the single-resonator system, and the blue line (higher peak) is for the double-resonator system. Referring to FIG. 27, the operational frequency for both of these resonators was 35 MHz or about 35 MHz.

Figure 28:
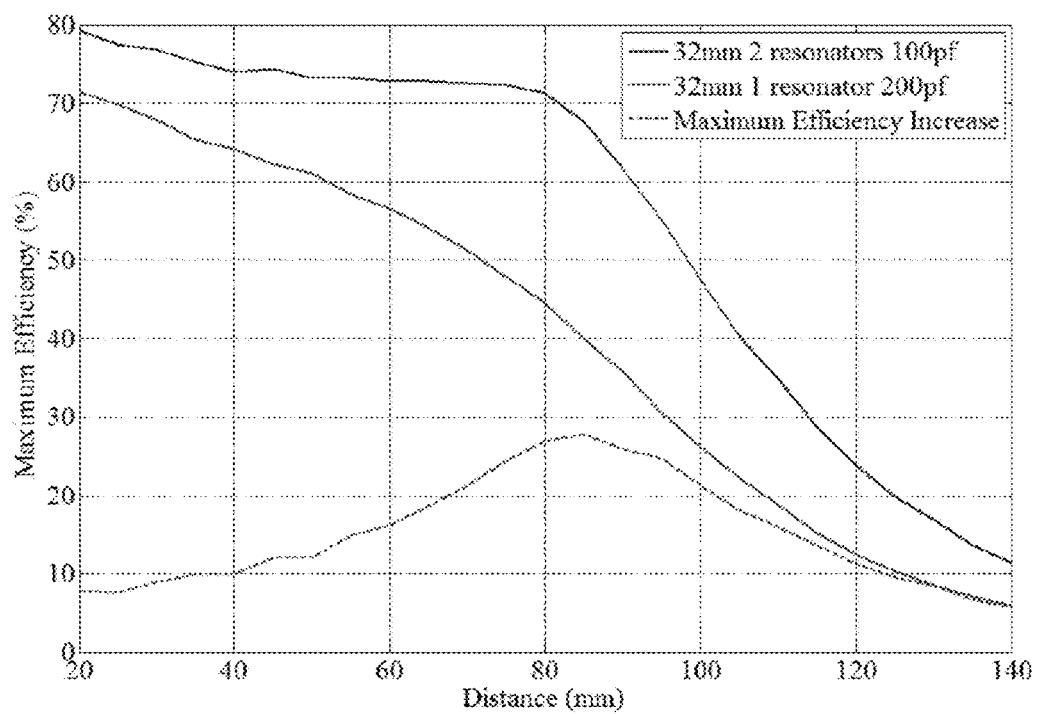
FIG. 28 shows a plot of efficiency versus distance for a CSCMR system.

FIG. 28 shows a plot of the maximum power transfer efficiency versus distance between TX and RX elements (in mm) for the single- and double-resonator systems. The blue solid line (uppermost of the solid lines at the left of the plot) is for the double-resonator system, the green solid line (lowermost of the solid lines at the left of the plot) is for the single-resonator system, and the red dashed line is for the maximum efficiency increase of the double-resonator system over the single-resonator system. Referring to FIG. 28, at a distance (between the TX and RX elements) of 80 mm, and at an operational frequency of 35 MHz, the double-resonator system has an efficiency that is about 28% higher than that of the single-resonator system.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein (including those in the "References" section) are incorporated by reference in their entirety, including all figures and tables, to the extent they are not inconsistent with the explicit teachings of this specification.

REFERENCES

U.S. Pat. No. 1,119,732 ("Apparatus for Transmitting Electrical Energy", N. Tesla, 1914).
N. D. Donaldson, and T. A. Perkins, Med. Biol. Eng. Comput. 21, 612-627 (1983).
A. Kurs, A. Karalis, R. Moffatt, et al. "Wireless power transfer via strongly coupled magnetic resonances," Science, 2007, 317(5834):83-86.
H. Hu, K. Bao, J. Gibson, and S. V. Georgakopoulos, "Printable and Conformal Strongly Coupled Magnetic Resonant Systems for Wireless Powering," IEEE 15th Annual IEEE Wireless and Microwave Technology Conference (WAMICON), Tampa Bay, Fla., Jun. 6, 2014.

What is claimed is:

1. A wireless power transfer (WPT) system, comprising:
a transmitter (TX) element; and
a receiver (RX) element,
the TX element comprising:
  a TX lumped capacitor;
  a source loop on a first surface of a TX substrate;
  a first TX resonator disposed on the first surface of the TX substrate; and
  a second TX resonator, the second TX resonator being disposed either on a second surface of the TX substrate opposite to the first surface of the TX substrate or within the TX substrate as a layer between the first and second surfaces of the TX substrate, and the second TX resonator and the first TX resonator being physically disconnected from the source loop and from each other, and
the RX element comprising:

a RX lumped capacitor;
a first RX resonator disposed on a first surface of a RX substrate; and
a second RX resonator, wherein the second RX resonator is disposed either on a second surface of the RX substrate opposite to the first surface of the RX substrate or within the RX substrate as a layer between the first and second surfaces of the RX substrate.

2. The WPT system according to claim 1, wherein the RX element further comprises a load.

3. The WPT system according to claim 1, wherein the TX element further comprises TX input/output ports, and wherein the RX element further comprises RX input/output ports.

4. The WPT system according to claim 1, wherein the second TX resonator is disposed on the second surface of the TX substrate.

5. The WPT system according to claim 1, wherein the second TX resonator is disposed within the TX substrate as a layer between the first and second surfaces of the TX substrate.

6. The WPT system according to claim 1, wherein the second RX resonator is disposed on the second surface of the RX substrate.

7. The WPT system according to claim 1, wherein the second RX resonator is disposed within the RX substrate as a layer between the first and second surfaces of the RX substrate.

8. The WPT system according to claim 1, wherein the second TX resonator is disposed within the TX substrate as a layer between the first and second surfaces of the TX substrate, and
wherein the TX element further comprises a third TX resonator disposed on the second surface of the TX substrate.

9. The WPT system according to claim 8, wherein the second RX resonator is disposed within the RX substrate as a layer between the first and second surfaces of the RX substrate, and
wherein the RX element further comprises a third RX resonator disposed on the second surface of the RX substrate.

10. The WPT system according to claim 9, wherein the first TX resonator corresponds in size to the first RX resonator,
wherein the second TX resonator corresponds in size to the second RX resonator, and
wherein the third TX resonator corresponds in size to the third RX resonator.

11. The WPT system according to claim 1, wherein the first TX resonator corresponds in size to the first RX resonator, and wherein the second TX resonator corresponds in size to the second RX resonator.

12. The WPT system according to claim 1, wherein the capacitance of the TX lumped capacitor is the same as that of the RX lumped capacitor.

13. The WPT system according to claim 1, wherein the capacitance of the TX lumped capacitor is tunable, and wherein the capacitance of the RX lumped capacitor is tunable.

14. The WPT system according to claim 1, wherein the second TX resonator is disposed within the TX substrate as a first TX middle layer between the first and second surfaces of the TX substrate,
wherein the TX element further comprises a third TX resonator disposed on the second surface of the TX substrate,
wherein the TX element further comprises at least one additional TX middle layer between the first and second surfaces of the TX substrate,
wherein each additional TX middle layer includes an additional TX resonator,
wherein the second RX resonator is disposed within the RX substrate as a first RX middle layer between the first and second surfaces of the RX substrate,
wherein the RX element further comprises a third RX resonator disposed on the second surface of the RX substrate,
wherein the RX element further comprises at least one additional RX middle layer between the first and second surfaces of the RX substrate, and
wherein each additional RX middle layer includes an additional RX resonator.

15. The WPT system according to claim 1, which has an operational frequency of less than 65 MHz,
wherein the WPT system has an efficiency of at least 80% when the TX element and the RX element are physically separated from each other by at least 60 mm, and
wherein the radius of the TX element is less than 35 mm, and wherein the radius of the RX element is less than 35 mm.

16. The WPT system according to claim 1, wherein the TX substrate is an FR4 printed circuit board (PCB), and wherein the RX substrate is an FR4 PCB.

17. A wireless power transfer (WPT) system, comprising:
a transmitter (TX) element; and
a receiver (RX) element,
the TX element and the RX element being physically separated from each other in use,
the TX element comprising:
a TX lumped capacitor;
at least one TX input/output port;
a source loop on a first surface of a TX substrate;
a first TX resonator disposed on the first surface of the TX substrate; and
a second TX resonator, the second TX resonator being disposed on a second surface of the TX substrate opposite to the first surface of the TX substrate, and the second TX resonator and the first TX resonator being physically disconnected from the source loop and from each other, and
the RX element comprises comprising:
a RX lumped capacitor;
a load;
at least one RX input/output port;
a first RX resonator disposed on a first surface of a RX substrate; and
a second RX resonator, wherein the second RX resonator is disposed on a second surface of the RX substrate opposite to the first surface of the RX substrate.

18. The WPT system according to claim 17, wherein the TX element further comprises at least one TX middle layer between the first and second surfaces of the TX substrate,
wherein each TX middle layer includes an additional TX resonator,
wherein the RX element further comprises at least one RX middle layer between the first and second surfaces of the RX substrate, and
wherein each RX middle layer includes an additional RX resonator.

19. The WPT system according to claim 18, wherein the first TX resonator corresponds in size to the first RX resonator,
  wherein the second TX resonator corresponds in size to the second RX resonator,
  wherein each additional TX resonator corresponds in size to each additional RX resonator, respectively,
  wherein the WPT system has an operational frequency of less than 65 MHz,
  wherein the WPT system has an efficiency of at least 80% when the TX element and the RX element are physically separated from each other by at least 60 mm, and
  wherein the radius of the TX element is less than 35 mm, and wherein the radius of the RX element is less than 35 mm.

20. The WPT system according to claim 19, wherein the TX substrate is an FR4 printed circuit board (PCB), and wherein the RX substrate is an FR4 PCB.

* * * * *